(12) United States Patent
Ikeda et al.

(10) Patent No.: US 12,372,397 B2
(45) Date of Patent: Jul. 29, 2025

(54) ULTRAVIOLET-SENSING MEMBER, MICROCAPSULE, PRODUCTION METHOD OF MICROCAPSULE, DISPERSION LIQUID FOR FORMING ULTRAVIOLET-SENSING LAYER, AND ULTRAVIOLET-SENSING KIT

(71) Applicant: FUJIFILM Corporation, Tokyo (JP)

(72) Inventors: Kimi Ikeda, Shizuoka (JP); Masahiro Hatta, Shizuoka (JP)

(73) Assignee: FUJIFILM Corporation, Tokyo (JP)

( * ) Notice: Subject to any disclaimer, the term of this patent is extended or adjusted under 35 U.S.C. 154(b) by 227 days.

(21) Appl. No.: 18/451,860

(22) Filed: Aug. 18, 2023

(65) Prior Publication Data

US 2023/0392980 A1 Dec. 7, 2023

Related U.S. Application Data

(63) Continuation of application No. PCT/JP2022/005931, filed on Feb. 15, 2022.

(30) Foreign Application Priority Data

Feb. 26, 2021 (JP) ................. 2021-030906

(51) Int. Cl.
*G01J 1/42* (2006.01)
*G01J 1/50* (2006.01)
*G03C 1/675* (2006.01)

(52) U.S. Cl.
CPC ............. *G01J 1/429* (2013.01); *G01J 1/50* (2013.01); *G03C 1/675* (2013.01)

(58) Field of Classification Search
CPC ... G01J 1/429; G01J 1/50; G03C 1/675; B01J 13/14
See application file for complete search history.

(56) References Cited

U.S. PATENT DOCUMENTS

| 4,682,194 A | 7/1987 | Usami et al. |
| 2009/0194708 A1 | 8/2009 | Studer et al. |

(Continued)

FOREIGN PATENT DOCUMENTS

| JP | S6089352 | 5/1985 |
| JP | S60242094 | 12/1985 |

(Continued)

OTHER PUBLICATIONS

"International Search Report (Form PCT/ISA/210) of PCT/JP2022/005931," mailed on Apr. 26, 2022, with English translation thereof, pp. 1-5.

(Continued)

*Primary Examiner* — Kiho Kim
(74) *Attorney, Agent, or Firm* — JCIPRNET

(57) ABSTRACT

A first object of the present invention is to provide an ultraviolet-sensing member having excellent storage stability and image stability. In addition, a second object of the present invention is to provide a microcapsule, a production method of a microcapsule, a dispersion liquid for forming an ultraviolet-sensing layer, and an ultraviolet-sensing kit. The ultraviolet-sensing member of the present invention is an ultraviolet-sensing member including an ultraviolet-sensing layer containing a microcapsule which contains a photoactivator, a color-forming agent, and an aromatic solvent, in which the aromatic solvent includes an aromatic solvent including a heteroatom and an aromatic solvent including no heteroatom.

20 Claims, 2 Drawing Sheets

(56) References Cited

U.S. PATENT DOCUMENTS

| | | | |
|---|---|---|---|
| 2017/0131144 A1* | 5/2017 | Hatta | G01J 1/429 |
| 2018/0169279 A1 | 6/2018 | Randers-Pehrson et al. | |
| 2020/0085984 A1 | 3/2020 | Randers-Pehrson et al. | |
| 2020/0215215 A1 | 7/2020 | Randers-Pehrson et al. | |
| 2020/0306397 A1 | 10/2020 | Randers-Pehrson et al. | |
| 2020/0353112 A1 | 11/2020 | Randers-Pehrson et al. | |
| 2021/0236672 A1 | 8/2021 | Randers-Pehrson et al. | |

FOREIGN PATENT DOCUMENTS

| | | |
|---|---|---|
| JP | 2010501655 | 1/2010 |
| JP | 2018517488 | 7/2018 |
| WO | 2016017701 | 2/2016 |

OTHER PUBLICATIONS

"Written Opinion of the International Searching Authority (Form PCT/ISA/237) of PCT/JP2022/005931," mailed on Apr. 26, 2022, with English translation thereof, pp. 1-6.

* cited by examiner

ULTRAVIOLET-SENSING MEMBER, MICROCAPSULE, PRODUCTION METHOD OF MICROCAPSULE, DISPERSION LIQUID FOR FORMING ULTRAVIOLET-SENSING LAYER, AND ULTRAVIOLET-SENSING KIT

CROSS-REFERENCE TO RELATED APPLICATIONS

This application is a Continuation of PCT International Application No. PCT/JP2022/005931 filed on Feb. 15, 2022, which claims priority under 35 U.S.C. § 119(a) to Japanese Patent Application No. 2021-030906 filed on Feb. 26, 2021. The above applications are hereby expressly incorporated by reference, in their entirety, into the present application.

BACKGROUND OF THE INVENTION

1. Field of the Invention

The present invention relates to an ultraviolet-sensing member, a microcapsule, a production method of a microcapsule, a dispersion liquid for forming an ultraviolet-sensing layer, and an ultraviolet-sensing kit.

2. Description of the Related Art

A measurement of an amount of ultraviolet rays has been carried out in various fields. Specific examples thereof include a measurement of an amount of ultraviolet rays to an object to be irradiated in a curing reaction of an ultraviolet curing resin, and a measurement of an amount of ultraviolet rays to an object to be irradiated in an ultraviolet sterilization of food or the like.

An ultraviolet light intensity meter is used as a method for measuring the amount of ultraviolet rays.

There are various types of ultraviolet light intensity meters, such as an ultraviolet light intensity meter using a semiconductor electromotive force and an ultraviolet light intensity meter using a photochromic. For example, WO2016/017701A discloses an ultraviolet-sensing sheet including, as the ultraviolet light intensity meter, an ultraviolet-sensing layer which contains a capsule including a color-forming agent and a photooxidant.

SUMMARY OF THE INVENTION

As a result of studying the ultraviolet-sensing sheet disclosed in WO2016/017701A, the present inventors have found that, even a sheet in an unused state (that is, a state before being used for measuring the amount of ultraviolet rays) may form color in a case of being left in a hot environment for a long period of time. That is, it has been clarified that there is room for improvement in storage stability of the ultraviolet-sensing sheet.

In addition, the present inventors have found that, in a case where the ultraviolet-sensing sheet disclosed in WO2016/017701A is left in a moist and heat environment for a long period of time after being used for measuring the amount of ultraviolet rays, a color density of a colored part which forms color by irradiation with ultraviolet rays (in other words, a color density of a color-formed image) may be lighter. That is, it has been clarified that there is room for improvement in that the color density of the colored part which forms color by irradiation with ultraviolet rays does not easily decrease (hereinafter, also referred to as "excellent in image stability").

Therefore, an object of the present invention is to provide an ultraviolet-sensing member having excellent storage stability and image stability.

Another object of the present invention is to provide a microcapsule, a production method of a microcapsule, a dispersion liquid for forming an ultraviolet-sensing layer, and an ultraviolet-sensing kit.

As a result of intensive studies to achieve the above-described objects, the present inventors have found that the above-described objects can be achieved by the following configurations, and have completed the present invention.

[1] An ultraviolet-sensing member comprising:
an ultraviolet-sensing layer containing a microcapsule which contains a photoactivator, a color-forming agent, and an aromatic solvent,
in which the aromatic solvent includes an aromatic solvent including a heteroatom and an aromatic solvent including no heteroatom.

[2] The ultraviolet-sensing member according to [1],
in which the photoactivator includes a compound represented by General Formula (6) described later.

[3] The ultraviolet-sensing member according to [1] or [2],
in which a mass content ratio of the aromatic solvent including a heteroatom to the aromatic solvent including no heteroatom is 35/65 to 85/15.

[4] The ultraviolet-sensing member according to any one of [1] to [3],
in which the aromatic solvent includes one or more aromatic solvents having a boiling point of 100° C. or higher.

[5] The ultraviolet-sensing member according to any one of [1] to [4],
in which the aromatic solvent including a heteroatom includes aromatic phosphate. [6] The ultraviolet-sensing member according to any one of [1] to [5],
in which the photoactivator is a photooxidant, and
the color-forming agent is a color-forming agent which forms color by being oxidized.

[7] The ultraviolet-sensing member according to any one of [1] to [5],
in which the photoactivator is a photoacid generator, and
the color-forming agent is a color-forming agent which forms color by action of acid.

[8] The ultraviolet-sensing member according to any one of [1] to [7],
in which a capsule wall of the microcapsule contains one or more resins selected from the group consisting of polyurea, polyurethane urea, and polyurethane.

[9] A microcapsule comprising:
a photoactivator;
a color-forming agent; and
an aromatic solvent,
in which the aromatic solvent includes an aromatic solvent including a heteroatom and an aromatic solvent including no heteroatom.

[10] The microcapsule according to [9],
in which the photoactivator includes a compound represented by General Formula (6) described later.

[11] The microcapsule according to [9] or [10],
in which a mass content ratio of the aromatic solvent including a heteroatom to the aromatic solvent including no heteroatom is 35/65 to 85/15.

[12] The microcapsule according to any one of [9] to [11],
in which the aromatic solvent includes one or more aromatic solvents having a boiling point of 100° C. or higher.

[13] The microcapsule according to any one of [9] to [12], in which the aromatic solvent including a heteroatom includes aromatic phosphate.
[14] The microcapsule according to any one of [9] to [13], in which the photoactivator is a photooxidant, and the color-forming agent is a color-forming agent which forms color by being oxidized.
[15] The microcapsule according to any one of [9] to [13], in which the photoactivator is a photoacid generator, and the color-forming agent is a color-forming agent which forms color by action of acid.
[16] The microcapsule according to any one of [9] to [15], in which a capsule wall of the microcapsule contains one or more resins selected from the group consisting of polyurea, polyurethane urea, and polyurethane.
[17] A production method of the microcapsule according any one of [9] to [16], the production method comprising:
 a step of mixing the color-forming agent, the photoactivator, the aromatic solvent, and an emulsifier in water to prepare an emulsified liquid; and
 a step of forming a resin wall around an oil droplet including the color-forming agent, the photoactivator, and the aromatic solvent in the emulsified liquid obtained in the step to encapsulate the oil droplet and form the microcapsule.
[18] A dispersion liquid for forming an ultraviolet-sensing layer, comprising:
 the microcapsule according to any one of [9] to [16].
[19] An ultraviolet-sensing kit comprising:
 the ultraviolet-sensing member according to any one of [1] to [8].

According to the present invention, it is possible to provide an ultraviolet-sensing member having excellent storage stability and image stability.

In addition, according to the present invention, it is possible to provide a microcapsule, a production method of a microcapsule, a dispersion liquid for forming an ultraviolet-sensing layer, and an ultraviolet-sensing kit.

DESCRIPTION OF THE PREFERRED EMBODIMENTS

Figure 1:
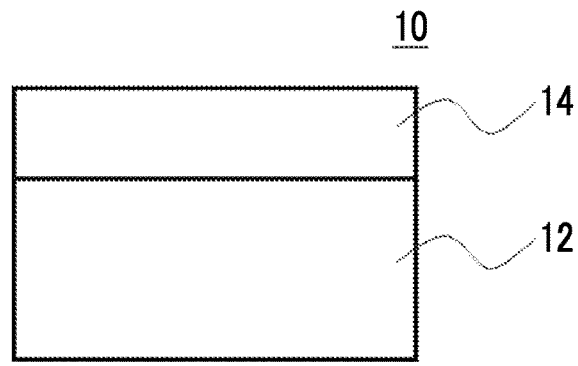
FIG. 1 is a schematic cross-sectional view showing an example of an embodiment of the ultraviolet-sensing member according to the present invention.

Hereinafter, the present invention will be described in detail.
The description of the configuration requirements described below is made on the basis of representative embodiments of the present invention, but it should not be construed that the present invention is limited to those embodiments.

In the present specification, the numerical ranges shown using "to" indicate ranges including the numerical values described before and after "to" as the lower limit value and the upper limit value.

In addition, regarding numerical ranges that are described stepwise in the present specification, an upper limit value or a lower limit value described in a numerical range may be replaced with an upper limit value or a lower limit value of another stepwise numerical range. In addition, in the numerical range described in the present specification, an upper limit value and a lower limit value described in a certain numerical range may be replaced with values shown in Examples.

In addition, in the present specification, a solid content means a component forming a composition layer formed of a composition, and in a case where the composition contains a solvent (organic solvent, water, and the like), the solid content means all components excluding the solvent. In addition, in a case where the components are components which form a composition layer, the components are considered to be solid contents even in a case where the components are liquid components.

In addition, in the present specification, ultraviolet rays are intended to be light having a wavelength range of 10 to 400 nm.

In addition, in the present specification, (meth)acrylic means "at least one of acrylic or methacrylic".

In addition, in the present specification, "boiling point" refers to a boiling point at a standard atmospheric present.

[Ultraviolet-Sensing Member]

The ultraviolet-sensing member according to the embodiment of the present invention is an ultraviolet-sensing member including an ultraviolet-sensing layer containing a microcapsule which contains a photoactivator, a color-forming agent, and an aromatic solvent, in which the aromatic solvent includes an aromatic solvent including a heteroatom and an aromatic solvent including no heteroatom.

The ultraviolet-sensing member according to the embodiment of the present invention, having such a configuration, is excellent in storage stability and image stability. Although the details thereof are not clear, the present inventors have presumed as follows.

In a case where the ultraviolet-sensing layer of the ultraviolet-sensing member according to the embodiment of the present invention is irradiated with ultraviolet rays for measuring an amount of ultraviolet rays, in a region irradiated with ultraviolet rays (ultraviolet-irradiated region), a colored part (color-formed image) is formed with a color optical density corresponding to the amount of ultraviolet rays (for example, integrated illuminance). The fact that color is formed with the color optical density corresponding to the amount of ultraviolet rays means that the color-formed image has gradation properties according to the amount of ultraviolet rays.

A main color-forming mechanism of the ultraviolet-sensing layer is derived from the microcapsule contained in the ultraviolet-sensing layer. In a case where the ultraviolet-sensing layer is irradiated with ultraviolet rays, a color-forming agent present in the ultraviolet-irradiated region usually forms color in the microcapsule. Specifically, for example, in a case where the photoactivator is a compound which absorbs ultraviolet rays and is activated to generate an acid and/or a radical, the photoactivator absorbs ultraviolet rays and is activated to generate an acid and/or a radical, and the color-forming agent forms color by reaction with this acid and/or radical. In this case, an amount of acid and/or radical generated from the photoactivator varies depending on the amount of ultraviolet rays irradiated, and an amount of the color-forming agent which forms color also varies depending on the amount of acid and/or radical generated from the photoactivator. As a result, in the ultraviolet-irradiated region of the ultraviolet-sensing layer, shade of the color optical density is generated according to the amount of ultraviolet rays irradiated, and the colored part is formed with the color optical density corresponding to the amount of ultraviolet rays.

A feature point of the ultraviolet-sensing member according to the embodiment of the present invention include a point that the microcapsule in the ultraviolet-sensing layer contains a photoactivator, a color-forming agent, and an aromatic solvent, and the aromatic solvent includes each aromatic solvent including a heteroatom and aromatic solvent including no heteroatom.

The aromatic solvent including a heteroatom has a relatively high polarity due to the presence of the heteroatom, while the aromatic solvent including no heteroatom has a relatively low polarity due to the absence of the heteroatom.

Recently, the present inventors have found that, in a case where the microcapsule in the ultraviolet-sensing layer contains only the aromatic solvent including a heteroatom as the aromatic solvent, even a member in an unused state can easily form color in a case of being left in a hot environment for a long period of time (storage stability is deteriorated). As a cause of this, it is presumed that the aromatic solvent including a heteroatom, which has a relatively high polarity, makes the color-forming agent in the microcapsule to stable (for example, in a case where the color-forming agent is a leuco coloring agent, a leuco reductant (color-forming agent) is extremely easily generated). On the other hand, it has been found that, in the microcapsule in the ultraviolet-sensing layer, containing only the aromatic solvent including no heteroatom as the aromatic solvent, in a case where a member after being used for measuring the amount of ultraviolet rays is left in a moist and heat environment for a long period of time, a color density of the colored part which forms color by irradiation with ultraviolet rays is lighter. As a cause of this, it is presumed that, due to the aromatic solvent including no heteroatom, which has a relatively low polarity, it is difficult to stabilize a coloring body (color-forming agent) generated by a coloring reaction of the color-forming agent in the microcapsule in the member after being used for measuring the amount of ultraviolet rays.

As a result of intensive studies based on the above-described findings, the present inventors have found that, in a case where the microcapsule in the ultraviolet-sensing layer contains, as the aromatic solvent, each aromatic solvent including a heteroatom and aromatic solvent including no heteroatom, storage stability of the ultraviolet-sensing member in an unused state and image stability of the ultraviolet-sensing member after being used for measuring the amount of ultraviolet rays can be achieved at both excellent levels.

In the following, the fact that the storage stability of the ultraviolet-sensing member is more excellent, the image stability is more excellent, and/or the sensitivity is more excellent may also be referred to as "effects of the present invention are more excellent".

Hereinafter, embodiments of the ultraviolet-sensing member according to the present invention will be described in detail with reference to the drawings.

First Embodiment

FIG. 1 is a schematic cross-sectional view of one embodiment of the ultraviolet-sensing member.

An ultraviolet-sensing member 10 includes a support 12 and an ultraviolet-sensing layer 14 which is disposed on one surface of the support 12 and contains a microcapsule containing a photoactivator, a color-forming agent, and an aromatic solvent. In the ultraviolet-sensing layer 14 which is irradiated with ultraviolet rays, a colored part (not shown) which forms color with a color optical density corresponding to an amount of ultraviolet rays is formed.

In FIG. 1 (and FIGS. 2 to 6 shown in the latter part), an aspect in which the ultraviolet-sensing member is sheet-like is shown, but the present invention is not limited to this aspect. As for the shape of the ultraviolet-sensing member, various shapes such as a block shape, for example, a rectangular parallelepiped shape, a cylindrical shape, and the like can be used. Among these, a sheet-like ultraviolet-sensing member is suitably used.

In addition, as the shape of the sheet-like ultraviolet-sensing member, various shapes such as a square shape, a rectangular shape, a circular shape, an elliptical shape, a polygonal shape other than a quadrangular shape, for example, a hexagonal shape and the like, and an amorphous shape can be used. In addition, the sheet-like ultraviolet-sensing member may have a long shape.

As will be described later, it is sufficient that the ultraviolet-sensing member 10 includes the ultraviolet-sensing layer 14, and the support 12 may not be included.

Furthermore, the ultraviolet-sensing member 10 shown in FIG. 1 has a two-layer configuration of the support 12 and the ultraviolet-sensing layer 14, but the present invention is not limited to this aspect. As will be described later, the ultraviolet-sensing member 10 may include a layer other than the support 12 and the ultraviolet-sensing layer 14 (for example, a reflective layer, a glossy layer, a filter layer, or the like).

A lower limit value of a thickness of the ultraviolet-sensing member 10 is preferably 5 µm or more and more preferably 25 µm or more. In addition, the upper limit value thereof is preferably 1 cm or less, more preferably 2 mm or less, and still more preferably 250 µm or less.

Hereinafter, each member of the ultraviolet-sensing member will be described in detail.

<<Support>>

The support is a member for supporting the ultraviolet-sensing layer. In a case where the ultraviolet-sensing layer itself can be handled, the ultraviolet-sensing member may not include the support.

Examples of the support include a resin sheet, paper (including synthetic paper), cloth (including woven fabric and nonwoven fabric), glass, wood, and metal. As the support, a resin sheet or paper is preferable, a resin sheet or synthetic paper is more preferable, and a resin sheet is still more preferable.

Examples of a material of the resin sheet include a polyethylene-based resin, a polypropylene-based resin, a cyclic polyolefin-based resin, a polystyrene-based resin, an acrylonitrile-styrene copolymer, an acrylonitrile-butadiene-styrene copolymer, a polyvinyl chloride-based resin, a fluorine-based resin, a poly(meth)acrylic resin, a polycarbonate-based resin, a polyester-based resin (polyethylene terephthalate, polyethylene naphthalate, and the like), a polyamide-based resin such as various nylons, a polyimide-based resin, a polyamide-imide-based resin, a polyaryl phthalate-based resin, a silicone-based resin, a polysulfonebased resin, a polyphenylene sulfide-based resin, a polyethersulfone-based resin, a polyurethane-based resin, an acetal-based resin, and a cellulose-based resin.

Examples of the synthetic paper include paper in which many microvoids are formed by biaxially stretching polypropylene or polyethylene terephthalate (YUPO and the like); paper produced from synthetic fibers such as polyethylene, polypropylene, polyethylene terephthalate, and polyamide; and paper in which these papers are laminated on part, one side, or both sides thereof.

In addition, examples of another suitable aspect of the resin sheet include a white resin sheet formed by dispersing a white pigment in a resin. Examples of a material of the resin in the above-described white resin sheet include the same materials as those in the resin sheet described above.

The white resin sheet has ultraviolet reflectivity. Therefore, in a case where the support is the white resin sheet, since ultraviolet rays irradiated to the ultraviolet-sensing member are reflected by the support, it is possible to suppress scattering of the ultraviolet rays inside the ultraviolet-sensing member. As a result, accuracy of detecting the amount of ultraviolet rays in the ultraviolet-sensing member can be further improved.

As the white pigment, white pigments described in paragraph 0080 of WO2016/017701A can be referred to. The contents thereof are incorporated in the present specification.

As the white resin sheet, for example, a white polyester sheet is preferable, and a white polyethylene terephthalate sheet is more preferable.

Examples of a commercially available product of the white resin sheet include YUPO (manufactured by YUPO Corporation), LUMIRROR (manufactured by Toray Industries Inc.), and CRISPER (manufactured by Toyobo Co., Ltd.).

A lower limit value of a thickness of the support is preferably 5 μm or more, more preferably 25 μm or more, and still more preferably 50 μm or more. In addition, the upper limit value thereof is preferably 1 cm or less, more preferably 2 mm or less, and still more preferably 250 μm or less.

<<Ultraviolet-Sensing Layer>>

The ultraviolet-sensing layer contains a microcapsule (hereinafter, also referred to as "specific microcapsule") containing a photoactivator, a color-forming agent, and an aromatic solvent including a heteroatom and an aromatic solvent including no heteroatom as an aromatic solvent.

Hereinafter, various components which can be contained in the ultraviolet-sensing layer will be described in detail.

<Specific Microcapsule>

The ultraviolet-sensing layer contains the specific microcapsule.

Hereinafter, first, materials constituting the specific microcapsule will be described in detail.

The specific microcapsule usually includes a core portion and a capsule wall for encompassing a core material (encompassed substance (also referred to as an encompassed component)) forming the core portion.

The specific microcapsule contains, as the core material (encompassed component), the photoactivator, the color-forming agent, and the aromatic solvent.

The specific microcapsule prevents contact between substances inside and outside the capsule by a substance-separating action of the capsule wall at normal temperature. Specific examples thereof include JP1984-190886A (JP-559-190886A) and JP1985-242094A (JP-S60-242094A), the contents of which are incorporated in the present specification.

(Capsule Wall)

It is preferable that the capsule wall of the specific microcapsule is substantially composed of a resin. The term "substantially composed of a resin" means that a content of the resin with respect to the total mass of the capsule wall is 90% by mass or more, preferably 100% by mass. That is, it is preferable that the capsule wall of the specific microcapsule is composed of a resin.

Examples of the above-described resin include polyurethane, polyurea, polyester, polycarbonate, a urea-formaldehyde resin, a melamine-formaldehyde resin, polystyrene, a styrene-methacrylate copolymer, gelatin, polyvinylpyrrolidone, and polyvinyl alcohol. Among these, from the viewpoint that the effects of the present invention can be further improved by forming a dense crosslinking structure which prevents encompassed substances from leaking, one or more selected from the group consisting of polyurea, polyurethane urea, and polyurethane are preferable.

The polyurea is a polymer having a plurality of urea bonds, and is preferably a reaction product formed from a raw material containing polyamine and polyisocyanate. It is also possible to synthesize the polyurea using the polyisocyanate without using the polyamine, by utilizing the fact that a part of the polyisocyanate reacts with water to form the polyamine.

In addition, the polyurethane urea is a polymer having a urethane bond and a urea bond, and is preferably a reaction product formed from a raw material containing polyol, polyamine, and polyisocyanate. In a case where the polyol is reacted with the polyisocyanate, a part of the polyisocyanate reacts with water to form the polyamine, and as a result, the polyurethane urea is obtained.

In addition, the polyurethane is a polymer having a plurality of urethane bonds, and is preferably a reaction product formed from a raw material containing polyol and polyisocyanate.

Examples of the polyisocyanate include diisocyanates such as m-phenylene diisocyanate, p-phenylene diisocyanate, 2,6-tolylene diisocyanate, 2,4-tolylene diisocyanate, naphthalene-1,4-diisocyanate, diphenylmethane-4,4-diisocyanate, 3,3'-dimethoxy-4,4'-hiphenyl-diisocyanate, 3,3'-dimethyldiphenylmethane-4,4'-diisocyanate, xylylene-1,4-diisocyanate, xylylene-1,3-diisocyanate, 4,4'-diphenylpropane diisocyanate, trimethylene diisocyanate, hexamethylene diisocyanate, propylene-1,2-diisocyanate, butylene-1,2-diisocyanate, cyclohexylene-1,2-diisocyanate, cyclohexylene-1,4-diisocyanate, isophorone diisocyanate, hydrogenated tolylene diisocyanate, hydrogenated xylene diisocyanate, and dicyclohexylmethane diisocyanate; triisocyanates such as 4,4',4'-triphenylmethane triisocyanate and toluene-2,4,6-triisocyanate; tetraisocyanates such as 4,4'-dimethyldiphenylmethane-2,2',5,5'-tetraisocyanate; and isocyanate prepolymers such as an adduct of hexamethylene diisocyanate and trimethylolpropane, an adduct of 2,4-tolylene diisocyanate and trimethylolpropane, an adduct of xylylene diisocyanate and trimethylolpropane, and an adduct of tolylene diisocyanate and hexanetriol.

In addition, examples of a commercially available product of the polyisocyanate include TAKENATE (registered trademark) D-102, D-103, D-103H, D-103M2, P49-75S, D-110N, D-120N, D-140N, D-160N, D-127N, D-170N, D-170HN, D-172N, D-177N, D-204, D-165N, and NP1100 (manufactured by Mitsui Chemicals, Inc.); Sumidur N3300, Desmodur (registered trademark) L75, UL57SP, N3200, N3600, N3900, and Z4470BA (manufactured by Sumika Bayer Urethane Co., Ltd.); CORONATE (registered trademark) HL, HX, L, and HK (manufactured by Nippon Polyurethane Industry Co., Ltd.); P301-75E (manufactured by Asahi Kasei Corporation); Duranate (registered trademark) TPA-100, TKA-100, TSA-100, TSS-100, TLA-100, 24A-100, and TSE-100 (manufactured by Asahi Kasei Corporation); and BURNOCK (registered trademark) D-750 (manufactured by DIC CORPORATION).

Examples of the polyol include aliphatic and aromatic polyhydric alcohols, hydroxypolyester, and hydroxypolyalkylene ether.

Specific examples thereof include polyols described in JP1985-049991A (JP-S60-049991A), ethylene glycol, 1,3-propanediol, 1,4-butanediol, 1,5-pentanediol, 1,6-hexanediol, 1,7-hebutanediol, 1,8-octanediol, propylene glycol, 2,3-dihydroxybutane, 1,2-dihydroxybutane, 1,3-dihydroxybutane, 2,2-dimethyl-1,3-propanediol, 2,4-pentanediol, 2,5-hexanediol, 3-methyl-1,5-pentanediol, 1,4-cyclohexanedimethanol, dihydroxycyclohexane, diethylene glycol, 1,2,6-trihydroxyhexane, 2-phenylpropylene glycol, 1,1,1-trimethylolpropane, hexanetriol, pentaerythritol, pentaerythritol ethylene oxide adduct, glycerin ethylene oxide adduct, glycerin, 1,4-di(2-hydroxyethoxy)benzene, a condensation product of aromatic polyhydric alcohol such as resorcinol dihydroxyethyl ether and alkylene oxide, p-xylylene glycol, m-xylylene glycol, α,α'-dihydroxy-p-diisopropylbenzene, 4,4'-dihydroxy-diphenylmethane, 2-(p,p'-dihydroxydiphenylmethyl)benzyl alcohol, ethylene oxide adduct of bisphenol A, and propylene oxide adduct of bisphenol A.

The polyol is preferably used in an amount such that a proportion of a hydroxyl group to 1 mol of an isocyanate group is 0.02 to 2 mol.

Examples of the polyamine include ethylenediamine, trimethylenediamine, tetramethylenediamine, pentamethylenediamine, hexamethylenediamine, p-phenylenediamine, m-phenylenediamine, piperazine, 2-methylpiperazine, 2,5-dimethylpiperazine, 2-hydroxytrimethylenediamine, diethylenetriamine, triethylenetriamine, triethylenetetramine, diethylaminopropylamine, tetraethylenepentamine, and amine adduct of an epoxy compound.

The polyisocyanate can also react with water to form a polymer substance.

The polyisocyanate, the polyol, and the polyamine are described in U.S. Pat. Nos. 3,281,383A, 3,773,695A, 3,793, 268A, JP1973-040347B (JP-S48-040347B), JP1974-024159B (JP-S49-024159B), JP1973-080191A (JP-S48-080191A), and JP1973-084086B (JP-S48-084086B), the contents of which are incorporated in the present specification.

An average particle diameter of the microcapsule is preferably 0.1 to 100 μm in terms of volume average particle diameter. The lower limit value thereof is more preferably 0.3 μm or more and still more preferably 0.5 μm or more. The upper limit value thereof is more preferably 10 μm or less and still more preferably 5 μm or less. In a case where the average particle diameter (volume average particle diameter) of the microcapsule is 0.1 μm or more, the core material in the capsule can be protected more stably. On the other hand, in a case where the average particle diameter (volume average particle diameter) of the microcapsule is 100 μm or less, resolution of the color-formed image is further improved.

The average particle diameter (volume average particle diameter) of the microcapsule can be measured by, for example, a laser analysis and scattering-type particle size distribution analyzer LA950 (manufactured by HORIBA, Ltd.).

In addition, in a case where an average particle diameter of the microcapsule contained in the ultraviolet-sensing member is measured, the average particle diameter (volume average particle diameter) of the microcapsule can be measured with a scanning electron microscope (SEM). Specifically, a surface of the ultraviolet-sensing layer is observed with the SEM at a magnification of 5,000, and the average particle diameter of all microcapsules present in the observed visual field is obtained image analysis. In a case where the microcapsule cannot be observed on the surface, a cross-sectional piece is produced and measured in the same manner as described above.

The above-described microcapsule means a concept including the specific microcapsule and a microcapsule other than the specific microcapsule.

(Color-Forming Agent)

The specific microcapsule contains a color-forming agent.

Here, the "color-forming agent" refers to a compound which forms color from a state in which it is substantially colorless (a state in which it is colorless or exhibits a light color). As the color-forming agent, a compound which forms color by reacting with an acid and/or radical generated from the photoactivator, which will be described later, is preferable.

As the color-forming agent, a compound which forms color by being oxidized or a compound which forms color by action of acid is preferable, and a leuco coloring agent is preferable.

The above-described leuco coloring agent is preferably a compound which forms color in a case of being oxidized from a substantially colorless state (hereinafter, also referred to as "oxidative color-forming leuco coloring agent") or a compound which forms color by the action of acid from a substantially colorless state (hereinafter, also referred to as "acid color-forming leuco coloring agent").

Examples of the leuco coloring agent include a triarylmethanephthalide-based compound, a fluoran-based compound, a phenothiazine-based compound, an indolylphthalide-based compound, an azaindolylphthalide-based compound, a leuco auramine-based compound, a rhodamine lactam-based compound, a triarylmethane-based compound, a diarylmethane-based compound, a triazene-based compound, a spiropyran-based compound, a thiazine-based compound, and a fluorene-based compound.

For details of the above-described compounds, reference can be made to the description of U.S. Pat. No. 3,445,234A, JP1993-257272A (JP-H5-257272A), and paragraphs to of WO2009/8248A.

The color-forming agent may be used alone or in combination of two or more kinds thereof.

Oxidative Color-Forming Leuco Coloring Agent

As one aspect of the oxidative color-forming leuco coloring agent, a compound having one or two hydrogen atoms, which forms color by removing electrons, is preferable. Examples of such an oxidative color-forming leuco coloring agent include (a) aminotriarylmethane, (b) aminoxanthine, (c) aminothioxanthine, (d) amino-9,10-dihydroacridine, (e) aminophenoxazine, (f) aminophenothiazine, (g) aminodihydrophenazine, (h) aminodiphenylmethane, (i) leuco indamine, (j) aminohydrocinnamic acid (cyanethane and leuco methine), (k) hydrazine, (l) leuco indigoid dye, (m) amino-2,3-dihydroanthraquinone, (n) tetrahalo-p,p'-biphenol, (o) 2-(p-hydroxyphenyl)-4,5-diphenylimidazole, and (p) phenethylaniline, which are described in U.S. Pat. No.

3,445,234A. Among the above-described (a) to (p), (a) to (i) form color by losing one hydrogen atom, and (j) to (p) form color by losing two hydrogen atoms.

Among these, aminoarylmethane is preferable, and aminotriarylmethane is more preferable.

As the aminotriarylmethane, a compound represented by Formula (L) or an acid salt thereof is preferable.

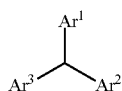 (L)

In the formula, Ar¹ represents (A1) a phenyl group having a R¹R²N-substituent at a para position with respect to a bond to a methane carbon atom specified in the formula. Ar² represents (A1) a phenyl group having a R¹R²N-substituent at a para position with respect to a bond to a methane carbon atom specified in the formula or (A2) a phenyl group having, at an ortho position with respect to the methane carbon atom specified in the formula, a substituent selected from the group consisting of an alkyl group (preferably, an alkyl group having 1 to 4 carbon atoms), an alkoxy group (preferably, an alkoxy group having 1 to 4 carbon atoms), a fluorine atom, a chlorine atom, and a bromine atom. R¹ and R² each independently represent a hydrogen atom, an alkyl group having 1 to 10 carbon atoms, a 2-hydroxyethyl group, a 2-cyanoethyl group, or a benzyl group.

Ar³ represents the same group as at least one of Ar¹ or Ar², or a group different from Ar¹ and Ar². In a case where Ar³ represents a group different from Ar¹ and Ar², Ar³ represents (B1) a phenyl group which may be substituted with a substituent selected from the group consisting of a lower alkyl group (preferably, an alkyl group having 1 to 4 carbon atoms), a lower alkoxy group (preferably, an alkoxy group having 1 to 4 carbon atoms), a chlorine atom, a diphenylamino group, a cyano group, a nitro group, a hydroxy group, a fluorine atom, a bromine atom, an alkylthio group, an arylthio group, a thioester group, an alkylsulfonic acid group, an arylsulfonic acid group, a sulfonic acid group, a sulfonamide group, an alkylamide group, and an arylamide group; (B2) a naphthyl group which may be substituted with a substituent selected from the group consisting of an amine group, a di-lower alkylamino group, and an alkylamino group; (B3) a pyridyl group which may be substituted with an alkyl group; (B4) a quinolyl group; or (B5) an indolinylidene group which may be substituted with an alkyl group.

In Formula (L), R¹ and R² are preferably a hydrogen atom or an alkyl having 1 to 4 carbon atoms.

In addition, in Formula (L), it is preferable that all of Ar¹, Ar², and Ar³ are (A1) the phenyl group having a R¹R²N-substituent at a para position with respect to a bond to a methane carbon atom specified in the formula, and it is more preferable that all of Ar¹, Ar², and Ar³ are the same group thereof.

Specific examples of the oxidative color-forming leuco coloring agent include tris(4-dimethylaminophenyl)methane, tris(4-diethylaminophenyl)methane, bis(4-diethylaminophenyl)-(4-diethylamino-2-methylphenyl)methane, bis(4-diethylamino-2-methylphenyl)-(4-diethylaminophenyl) methane, bis(1-ethyl-2-methylindol-3-yl)-phenylmethane, 2-N-(3-trifluoromethylphenyl)-N-ethylamino-6-diethylamino-9-(2-methoxycarbonylphenyl)xanthene, 2-(2-chlorophenyl)amino-6-dibutylamino-9-(2-methoxycarbonylphenyl)xanthene, 2-dibenzylamino-6-diethylamino-9-(2-methoxycarbonylphenyl)xanthene, benzo[a]-6-N,N-diethylamino-9,2-methoxycarbonylphenyl)xanthene, 2-(2-chlorophenyl)-amino-6-dibutylamino-9-(2-methylphenylcarboxamidophenyl)xanthene, 3,6-dimethoxy-9-(2-methoxycarbonyl)-phenylxanthene, benzoyl leuco methylene blue, and 3,7-bis-diethylaminophenoxazine.

Acid Color-Forming Leuco Coloring Agent

As one aspect of the acid color-forming leuco coloring agent, a compound which forms color by donating electrons or receiving protons such as an acid is preferable. Specific examples thereof include a compound which has a partial skeleton such as lactone, lactam, sultone, spiropyrane, ester, and amide, in which these partial skeletons are ring-opened or cleaved upon contact with an acid or a proton.

Examples of the leuco coloring agent which forms color by the action of acid (acid color-forming leuco coloring agent) include 3,3-bis(2-methyl-1-octyl-3-indolyl)phthalide, 6'-(dibutylamino)-2'-bromo-3'-methylspiro[phthalido-3,9'-xanthene], 3-(4-diethylamino-2-ethoxyphenyl)-3-(1-ethyl-2-methylindol-3-yl)-4-azaphthalide, 3-(4-diethylamino-2-ethoxyphenyl)-3-(1-n-octyl-2-methylindol-3-yl)phthalide, 3-[2,2-bis(1-ethyl-2-methylindol-3-yl)vinyl]-3-(4-diethylaminophenyl)-phthalide, 2-anilino-6-dibutylamino-3-methylfluorane, 6-diethylamino-3-methyl-2-(2,6-xylidino)-fluorane, 2-(2-chloroanilino)-6-dibutylaminofluorane, 3,3-bis(4-dimethylaminophenyl)-6-dimethylaminophthalide, 2-anilino-6-diethylamino-3-methylfluorane, 9-[ethyl(3-methylbutyl)amino]spiro[12H-benzo[a]xanthene-12,1'(3'H) isobenzofuran]-3'-one, 2'-methyl-6'-(N-p-tolyl-N-ethylamino)spiro[isobenzofuran-1(3H), 9'-[9H]xanthene]-3-one, 3',6'-bis(diethylamino)-2-(4-nitrophenyl)spiro[isoindole-1, 9'-xanthene]-3-one, 9-(N-ethyl-N-isopentylamino)spiro [benzo[a]xanthene-12,3'-phthalide], 2'-anilino-6'-(N-ethyl-N-isopentylamino)-3'-methyl spiro[phthalide-3,9'-[9H] xanthene], and 6'-(diethylamino)-1',3'-dimethylfluorane.

(Photoactivator)

The specific microcapsule contains a photoactivator. The photoactivator is not particularly limited as long as it is a compound which is activated by light, but is preferably a compound which causes the formment of the color-forming agent in a state of being activated by light. Among these, the photoactivator is preferably a compound which is activated by ultraviolet rays, and more preferably any one of a photooxidant or a photoacid generator.

In the specific microcapsule, from the viewpoint that the sensitivity is more excellent, a content ratio (photoactivator/ color-forming agent (mass ratio)) of the photoactivator to the color-forming agent is preferably 0.1 to 30 and more preferably 0.3 to 20. From the viewpoint that the effects of the present invention are more excellent, in a case where the photoactivator is a photooxidant, the content ratio of the photoactivator to the color-forming agent is still more preferably 0.4 to 3, and in a case where the photoactivator is a photoacid generator, the content ratio of the photoactivator to the color-forming agent is still more preferably 3 to 20. The content ratio of the photoactivator to the color-forming agent can be analyzed by extracting the ultraviolet-sensing layer with methanol and performing liquid chromatography analysis using a mixed solution of methanol and water as an eluent.

Photooxidant

The photooxidant is preferably a compound which can cause the formment of the color-forming agent by being activated by ultraviolet rays to generate a radical and exhibit an action of extracting the hydrogen atom of the color-forming agent.

Among these, the photooxidant is preferably any one of a radical generator or an organic halogen compound. In addition, it is also preferable to use the radical generator and the organic halogen compound in combination as the photooxidant. In a case where the radical generator and the organic halogen compound are used in combination, from the viewpoint that the gradation properties of the colored part are more excellent, a content ratio (radical generator/organic halogen compound (mass ratio)) of the radical generator to the organic halogen compound is preferably 0.1 to 10 and more preferably 0.5 to 5.

Radical Generator

The radical generator is not particularly limited as long as it is a compound which is activated by ultraviolet rays to generate a radical.

As the radical generator, a hydrogen-extracting radical generator is preferable. The hydrogen-extracting radical generator exhibits an action of extracting hydrogen atoms from the color-forming agent to promote the oxidation of the color-forming agent.

Examples of the radical generator include azide polymers described in The Lecture Summary, p. 55 for the Spring Meeting of the Society of Photographic Science and Technology of Japan, 1968; azide compounds described in U.S. Pat. No. 3,282,693A, such as 2-azidobenzoxazole, benzoylazide, and 2-azidobenzimidazole; compounds described in U.S. Pat. No. 3,615,568A, such as 3'-ethyl-1-methoxy-2-pyridothiacyanine perchlorate, 1-methoxy-2-methylpyridinium, and p-toluenesulfonate; lophine dimer compounds described in JP1987-039728B (JP-S62-039728B), such as a 2,4,5-triarylimidazole dimer; benzophenone; p-aminophenyl ketone; polynuclear quinone; and thioxanthenone.

Among these, one or more selected from a lophine dimer and benzophenone is preferable, and a lophine dimer is particularly preferable.

Examples of the lophine dimer include a hexaarylbiimidazole compound. As the hexaarylbiimidazole-based compound, compounds described in paragraph 0047 of WO2016/017701A can be referred to. The contents thereof are incorporated in the present specification.

Among these, 2,2'-bis(2-chlorophenyl)-4,4',5,5'-tetraphenyl-1,2'-biimidazole is preferable. As the 2,2'-bis(2-chlorophenyl)-4,4',5,5'-tetraphenyl-1,2'-biimidazole, for example, "B-CIM" manufactured by Hodogaya Chemical Co., Ltd., or the like can be used.

As the lophine dimer, a compound represented by General Formula (1) is also preferable.

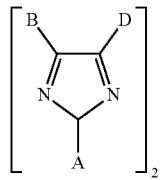

General Formula (1)

In General Formula (1), A, B, and D each independently represent a carbocyclic or heteroaryl group, which is unsubstituted or substituted with a substituent which does not interfere with dissociation of the dimer to an imidazolyl group or the oxidation of the color-forming agent.

It is preferable that B and D are each independently unsubstituted or have 1 to 3 substituents, and it is preferable that A is unsubstituted or has 1 to 4 substituents.

As the compound represented by General Formula (1) and a method of preparing the compound, a finding known as the lophine dimer or the like can be utilized. For example, the description of column 4, line 22 and column 6, line 3 of U.S. Pat. No. 3,552,973A can be referred to, the contents of which are incorporated in the present specification.

The radical generator may be used alone or in combination of two or more kinds thereof.

Organic Halogen Compound

The organic halogen compound can promote the oxidation of the color-forming agent.

From the viewpoint that the gradation properties of the colored part are more excellent, the organic halogen compound is preferably a compound in which the number of halogen atoms in the molecule is 3 or more. The upper limit value of the number of halogen atoms is preferably 9 or less. The organic halogen compound is a compound other than the lophine dimer and the benzophenone.

The organic halogen compound may be used alone or in combination of two or more kinds thereof.

Examples of the organic halogen compound include compounds represented by General Formulae (2) to (7).

$$P^0—CX_3 \qquad (2)$$

In the formula, $P^0$ represents a hydrogen atom, a halogen atom, an alkyl group which may have a substituent, or an aryl group which may have a substituent. X's each independently represent a halogen atom.

Examples of the halogen atom represented by $P^0$ and X include a fluorine atom, a chlorine atom, a bromine atom, and an iodine atom, and a chlorine atom or a bromine atom is preferable.

Examples of the substituent which can be included in the alkyl group and aryl group represented by $P^0$ include a hydroxy group, a halogen atom, an alkyl group having 1 to 6 carbon atoms, a haloalkyl group having 1 to 6 carbon atoms, an acetyl group, and an alkoxy group having 1 to 6 carbon atoms.

Examples of the compound represented by General Formula (2) include trichloromethane, tribromomethane, carbon tetrachloride, carbon tetrabromide, p-nitrobenzotribromide, bromotrichloromethane, pensitrichloride, hexabromoethane, iodoform, 1,1,1-tribromo-2-methyl-2-propanol, 1,1,2,2-tetrabromoethane, 2,2,2-tribromoethanol, and 1,1,1-trichloro-2-methyl-2-propanol.

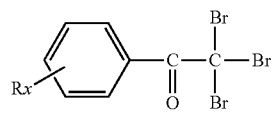

General Formula (3)

In the formula, R represents a substituent. x represents an integer of 0 to 5.

Examples of the substituent represented by R include a nitro group, a halogen atom, an alkyl group having 1 to 3 carbon atoms, a haloalkyl group having 1 to 3 carbon atoms, an acetyl group, a haloacetyl group, and an alkoxy group having 1 to 3 carbon atoms.

In a case where a plurality of R's are present in the formula, the R's may be the same or different from each other.

x is preferably 0 to 3.

Examples of the compound represented by General Formula (3) include o-nitro-α,α,α-tribromo acetophenone, m-nitro-α,α,α-tribromoacetophenone, p-nitro-α,α,α-tribromoacetophenone, α,α,α-tribromoacetophenone, and α,α,α-tribromo-3,4-cycloacetophenone.

    General Formula (4)

In the formula, $R^1$ represents an alkyl group which may have a substituent or an aryl group which may have a substituent. $X^1$ represents a halogen atom.

As the alkyl group represented by $R^1$, an alkyl group having 1 to 20 carbon atoms is preferable, an alkyl group having 1 to 10 carbon atoms is more preferable, and an alkyl group having 1 to 6 carbon atoms is still more preferable.

As the aryl group represented by $R^1$, an aryl group having 6 to 20 carbon atoms is preferable, an aryl group having 6 to 14 carbon atoms is more preferable, and an aryl group having 6 to 10 carbon atoms is still more preferable.

Examples of the substituent which can be included in the alkyl group and aryl group represented by $R^1$ include a nitro group, a halogen atom, an alkyl group having 1 to 3 carbon atoms, a haloalkyl group having 1 to 3 carbon atoms, an acetyl group, a haloacetyl group, and an alkoxy group having 1 to 3 carbon atoms.

Examples of the halogen atom represented by $X^1$ include a fluorine atom, a chlorine atom, a bromine atom, and an iodine atom, and a chlorine atom, a bromine atom, or an iodine atom is preferable and a chlorine atom or a bromine atom is more preferable.

Examples of the compound represented by General Formula (4) include 2,4-dinitrobenzenesulfonyl chloride, o-nitrobenzenesulfonyl chloride, m-nitrobenzenesulfonyl chloride, 3,3'-diphenylsulfonedisulfonyl chloride, ethanesulfonyl chloride, p-bromobenzenesulfonyl chloride, p-nitrobenzenesulfonyl chloride, p-3-benzenesulfonyl chloride, p-acetamidobenzenesulfonyl chloride, p-chlorobenzenesulfonyl chloride, p-toluenesulfonyl chloride, methanesulfonyl chloride, and benzenesulfonyl bromide.

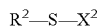    General Formula (5)

In the formula, $R^2$ represents an alkyl group which may have a substituent or an aryl group which may have a substituent. $X^2$ represents a halogen atom.

The alkyl group which may have a substituent and the aryl group which may have a substituent, represented by $R^2$, are the same as those of $R^1$ in General Formula (4), and suitable aspects thereof are also the same.

Examples of the halogen atom represented by $X^2$ include a fluorine atom, a chlorine atom, a bromine atom, and an iodine atom, and a chlorine atom, a bromine atom, or an iodine atom is preferable and a chlorine atom or a bromine atom is more preferable.

Examples of the compound represented by General Formula (5) include 2,4-dinitrobenzenesulfenyl chloride and o-nitrobenzenesulfenyl chloride.

    (6)

In the formula, $R^3$ represents an aryl group which may have a substituent or a heteroaryl group which may have a substituent. $L^1$ represents —SO— or —SO$_2$—. $X^3$, $X^4$, and $X^5$ each independently represent a hydrogen atom or a halogen atom. However, all of $X^3$, $X^4$, and $X^5$ are not hydrogen atoms at the same time.

As the aryl group represented by $R^3$, an aryl group having 6 to 20 carbon atoms is preferable, an aryl group having 6 to 14 carbon atoms is more preferable, and an aryl group having 6 to 10 carbon atoms is still more preferable.

As the heteroaryl group represented by $R^3$, a heteroaryl group having 4 to 20 carbon atoms is preferable, a heteroaryl group having 4 to 13 carbon atoms is more preferable, and a heteroaryl group having 4 to 9 carbon atoms is still more preferable.

Examples of the substituent which can be included in the aryl group and heteroaryl group represented by $R^3$ include a nitro group, a halogen atom, an alkyl group having 1 to 3 carbon atoms, a haloalkyl group having 1 to 3 carbon atoms, an acetyl group, a haloacetyl group, and an alkoxy group having 1 to 3 carbon atoms.

Examples of the halogen atom represented by $X^3$, $X^4$, and $X^5$ include a fluorine atom, a chlorine atom, a bromine atom, and an iodine atom, and a chlorine atom, a bromine atom, or an iodine atom is preferable and a chlorine atom or a bromine atom is more preferable.

Examples of the compound represented by General Formula (6) include hexabromodimethyl sulfoxide, pentabromodimethyl sulfoxide, hexabromodimethylsulfone, trichloromethylphenylsulfone, tribromomethylphenylsulfone, trichloro-p-chlorophenylsulfone, tribromomethyl-p-nitrophenylsulfone, 2-trichloromethylbenzothiazolesulfone, 4,6-dimethylpyrimidine-2-tribromomethylsulfone, tetrabromodimethylsulfone, 2,4-dichlorophenyltrichloromethylsulfone, 2-methyl-4-chlorophenyltrichloromethylsulfone, 2,5-dimethyl-4-chlorophenyltrichloromethylsulfone, 2,4-dichlorophenyltrimethylsulfone, and tri-p-tolylsulfonium trifluoromethanesulfonate. Among these, trichloromethylphenylsulfone or tribromomethylphenylsulfone is preferable.

    (7)

In the formula, $R^4$ represents a heteroaryl group which may have a substituent. $X^6$, $X^7$, and $X^8$ each independently represent a hydrogen atom or a halogen atom. However, all of $X^6$, $X^7$, and $X^8$ are not hydrogen atoms at the same time.

As the heteroaryl group represented by $R^4$, a heteroaryl group having 4 to 20 carbon atoms is preferable, a heteroaryl group having 4 to 13 carbon atoms is more preferable, and a heteroaryl group having 4 to 9 carbon atoms is still more preferable.

Examples of the substituent which can be included in the heteroaryl group represented by $R^4$ include a nitro group, a halogen atom, an alkyl group having 1 to 3 carbon atoms, a haloalkyl group having 1 to 3 carbon atoms, an acetyl group, a haloacetyl group, and an alkoxy group having 1 to 3 carbon atoms.

Examples of the halogen atom represented by $X^6$, $X^7$, and $X^8$ include a fluorine atom, a chlorine atom, a bromine atom, and an iodine atom, and a chlorine atom, a bromine atom, or an iodine atom is preferable and a chlorine atom or a bromine atom is more preferable.

Examples of the compound represented by General Formula (7) include tribromoquinaldine, 2-tribromomethyl-4-methylquinoline, 4-tribromomethylpyrimidine, 4-phenyl-6-tribromomethylpyrimidine, 2-trichloromethyl-6-nitrobenzothiazole, 1-phenyl-3-trichloromethylpyrazole, 2,5-ditribromomethyl-3,4-dibromothiophene, 2-trichloromethyl-3-(p-butoxy styryl)-1,3,4-oxadiazole, 2,6-didolychloromethyl-4-(p-methoxyphenyl)-triazine, and 2-(4-methylphenyl)-4,6-bis(trichloromethyl)-1,3,5-triazine.

Among these, from the viewpoint that the effects of the present invention are more excellent, the compound represented by General Formula (3), General Formula (6), General Formula (7) is preferable, the compound represented by General Formula (6) is more preferable, and as the halogen atom, a chlorine atom, a bromine atom, an iodine atom is preferable and a chlorine atom or a bromine atom is more preferable.

Photoacid Generator

The photoacid generator is preferably a compound which is cleaved by ultraviolet rays to generate an acid and can cause the formment of the color-forming agent by the action of acid.

Examples of the photoacid generator include a non-ionic photoacid generator and an ionic photoacid generator, and from the viewpoint that the effects of the present invention are more excellent, a non-ionic photoacid generator is preferable. Examples of the non-ionic photoacid generator include an organic halogen compound and an oxime compound, and among these, an organic halogen compound is preferable, and the compound represented by General Formula (6) described above is more preferable.

From the viewpoint that the gradation properties of the colored part are more excellent, the organic halogen compound is preferably a compound in which the number of halogen atoms in the molecule is 3 or more. The upper limit value of the number of halogen atoms is preferably 9 or less.

The organic halogen compound may be used alone or in combination of two or more kinds thereof.

Specific examples of the organic halogen compound include the same organic halogen compounds as those mentioned as the photooxidant in the upper part.

Examples of the ionic photoacid generator include a diazonium salt, an iodonium salt, and a sulfonium salt, and an iodonium salt or a sulfonium salt is preferable. Examples of the ionic photoacid generator include JP1987-161860A (JP-S62-161860A), JP1986-067034A (JP-S61-067034A), and JP1987-050382A (JP-S62-050382A), the contents of which are incorporated in the present specification.

In addition, the photoacid generator is not particularly limited as long as it is a compound which generates an acid by light, and the photoacid generator may be a photoacid generator which generates an inorganic acid such as a hydrogen halide (for example, hydrochloric acid), a sulfuric acid, and a nitric acid, or may be a photoacid generator which generates an organic acid such as a carboxylic acid and a sulfonic acid. From the viewpoint that the effects of the present invention are more excellent, a photoacid generator which generates an inorganic acid is preferable, and a photoacid generator which generates a hydrogen halide is more preferable.

Specific examples of the photoacid generator include triarylsulfonium hexafluorophosphate, triarylsulfonium arsenate and triarylsulfonium antimonate, diaryliodonium hexafluorophosphate, diaryliodonium arsenate and diaryliodonium antimonate, dialkylphenacylsulfonium tetrafluoroborate and dialkylphenacylsulfonium hexafluorophosphate, dialkyl-4-hydroxyphenylsulfonium tetrafluoroborate and dialkyl-4-hydroxyphenylsulfonium hexafluorophosphate, N-bromosuccinimide, tribromomethylphenylsulfone, diphenyliodine, 2-trichloromethyl-5-(p-butoxy styryl)-1,3,4-oxadiazole, and 2,6-ditrichloromethyl-4-(p-methoxyphenyl)-triazine.

(Aromatic Solvent)

The specific microcapsule contains an aromatic solvent.

In addition, the specific microcapsule contains, as the aromatic solvent, both aromatic solvent including a heteroatom and aromatic solvent including no heteroatom.

The aromatic solvent is intended to be a solvent having an aromatic ring in the molecule. The aromatic ring may be monocyclic or polycyclic.

Examples of the aromatic ring included in the aromatic solvent include an aromatic hydrocarbon ring and an aromatic heterocyclic ring, and from the viewpoint that the effects of the present invention are more excellent, an aromatic hydrocarbon ring is preferable.

The above-described aromatic hydrocarbon ring may be a monocyclic ring or a fused polycyclic ring, but from the viewpoint that the effects of the present invention are more excellent, a monocyclic ring is preferable.

In addition, the above-described aromatic hydrocarbon ring may have a substituent. In a case where the above-described aromatic hydrocarbon ring has a plurality of substituents, the substituents may be bonded to each other to form an alicyclic ring. In other words, the above-described aromatic hydrocarbon ring may include an alicyclic structure.

The number of carbon atoms in the above-described aromatic hydrocarbon ring is not particularly limited, but is preferably 6 to 30, more preferably 6 to 18, and still more preferably 6 to 10.

Examples of the monocyclic aromatic hydrocarbon ring include a benzene ring.

Examples of the fused polycyclic aromatic hydrocarbon ring include a naphthalene ring.

The above-described aromatic heterocyclic ring may be a monocyclic ring or a fused polycyclic ring.

In addition, the above-described aromatic heterocyclic ring may have a substituent. In a case where the above-described aromatic heterocyclic ring has a plurality of substituents, the substituents may be bonded to each other to form an alicyclic ring. In other words, the above-described aromatic heterocyclic ring may include an alicyclic structure.

Examples of a heteroatom included in the above-described aromatic heterocyclic ring include a nitrogen atom, an oxygen atom, and a sulfur atom. The number of ring members in the above-described aromatic heterocyclic ring is not particularly limited, but is preferably 5 to 18.

Specific examples of the above-described aromatic heterocyclic ring include a pyridine ring, a pyridazine ring, a pyrimidine ring, a pyrazine ring, a triazine ring, a thiophene ring, a thiazole ring, an imidazole ring, and a xanthene ring.

The number of aromatic rings in the aromatic solvent is not particularly limited, and may be one or two or more. In a case of including two or more aromatic rings, the two aromatic rings may form a polycyclic structure formed by bonding substituents which may exist on each aromatic ring to each other (however, excluding a fused polycyclic structure).

As described above, the specific microcapsule contains, as the aromatic solvent, both aromatic solvent including a heteroatom and aromatic solvent including no heteroatom.

In the aromatic solvent including a heteroatom, an introduction position of the heteroatom is not particularly limited. Examples of the aromatic solvent including a heteroatom include an aromatic solvent including an aromatic heterocyclic ring in the molecule and an aromatic solvent including a heteroatom and an aromatic hydrocarbon ring in the molecule.

Examples of the heteroatom in the aromatic solvent including a heteroatom include an atom other than a carbon atom and a hydrogen atom, and a nitrogen atom, an oxygen atom, a sulfur atom, or a phosphorus atom is preferable, and from the viewpoint that the effects of the present invention are more excellent, a phosphorus atom is more preferable.

Examples of the aromatic solvent including a heteroatom include a substituted or unsubstituted benzenesulfonic acid ester such as a compound represented by General Formula (1A) described later, a substituted or unsubstituted phthalic acid diester such as a compound represented by General Formula (1B) described later, and a substituted or unsubstituted aromatic phosphate such as a compound represented by General Formula (1C) described later. Among these, from the viewpoint that the effects of the present invention are more excellent, an aromatic phosphate is preferable.

The aromatic solvent including no heteroatom corresponds to an aromatic solvent including no atom other than a carbon atom and a hydrogen atom.

From the viewpoint that the effects of the present invention are more excellent, the aromatic solvent including no heteroatom is preferably an aromatic solvent including no polycyclic aromatic hydrocarbon ring, more preferably an aromatic solvent including one or two monocyclic aromatic hydrocarbon rings, and still more preferably an aromatic solvent including one or two benzene rings.

Examples of the aromatic solvent including no heteroatom include a compound represented by General Formula (1D) described later and a compound represented by General Formula (1E) described later.

In the specific microcapsule, the aromatic solvent including a heteroatom may be included alone or in combination of two or more kinds thereof. In addition, in the specific microcapsule, the aromatic solvent including no heteroatom may be included alone or in combination of two or more kinds thereof.

From the viewpoint that the effects of the present invention are more excellent, a mass content ratio of the aromatic solvent including a heteroatom to the aromatic solvent including no heteroatom (aromatic solvent including a heteroatom/aromatic solvent including no heteroatom) in the specific microcapsule is preferably 35/65 to 85/15.

From the viewpoint that solubility of the color-forming agent is excellent, and as a result, the effects of the present invention are more excellent, a mass content ratio of the aromatic solvent to the color-forming agent (aromatic solvent/color-forming agent) in the specific microcapsule is preferably 1 to 100, more preferably 5 to 50, and still more preferably 5 to 25.

The mass content ratio of the aromatic solvent including a heteroatom to the aromatic solvent including no heteroatom in the specific microcapsule can be measured by gas chromatography mass spectrometry analysis (GCMS analysis). As a specific method, the ultraviolet-sensing layer of the ultraviolet-sensing member is extracted with acetone, the obtained extract (filtered as necessary) is concentrated, and the obtained sample is subjected to the GCMS analysis, thereby measuring each type of the aromatic solvent including a heteroatom and the aromatic solvent including no heteroatom and the mass content ratio thereof. In addition, the mass content ratio of the aromatic solvent to the color-forming agent in the specific microcapsule can be measured by liquid chromatography analysis. As a specific method, the ultraviolet-sensing layer of the ultraviolet-sensing member is extracted with methanol, and the obtained extract is subjected to the liquid chromatography analysis using methanol/water as an eluent.

As the aromatic solvent including a heteroatom, for example, compounds represented by General Formulae (1A) to (1C) are preferable, and as the aromatic solvent including no heteroatom, for example, compounds represented by General Formulae (1D) and (1E) are preferable.

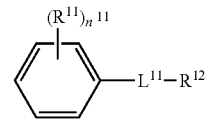

(1A)

In General Formula (1A), $L^{11}$ represents an oxysulfonyl group ($*^1$—$SO_2$—O—$*^2$) or a sulfonyloxy group ($*^1$—$SO_2$—$*^2$). $*^1$ represents a bonding position with a phenyl group specified in General Formula (1A), and $*^2$ represents a bonding position with $R^{12}$.

$R^{11}$ represents a non-aromatic substituent.

The non-aromatic substituent represented by $R^{11}$ is not particularly limited, but a monovalent aliphatic hydrocarbon group is preferable.

The monovalent aliphatic hydrocarbon group represented by $R^{11}$ may be a monovalent saturated aliphatic hydrocarbon group or a monovalent unsaturated aliphatic hydrocarbon group. In addition, it may be linear, branched, or cyclic.

The number of carbon atoms in the above-described monovalent aliphatic hydrocarbon group is not particularly limited, but is 1 to 20, preferably 1 to 15, more preferably 1 to 10, still more preferably 1 to 6, particularly preferably 1 to 4, and most preferably 1 to 3.

Examples of the above-described monovalent aliphatic hydrocarbon group include an alkyl group, an alkenyl group, and an alkynyl group, and an alkyl group is preferable.

The above-described monovalent aliphatic hydrocarbon group may further have a substituent.

$n^{11}$ represents an integer of 0 to 5. $n^{11}$ preferably represents an integer of 0 to 2.

In a case where $n^{11}$ represents an integer of 2 or more, a plurality of $R^{11}$'s may be the same or different from each other.

$R^{12}$ represents a monovalent aliphatic hydrocarbon group. Examples of the monovalent aliphatic hydrocarbon group represented by $R^{12}$ include the same group as the monovalent aliphatic hydrocarbon group represented by $R^{11}$.

Specific examples of the compound represented by General Formula (1A) include methyl benzenesulfonate, ethyl benzenesulfonate, methyl toluenesulfonate, and ethyl toluenesulfonate.

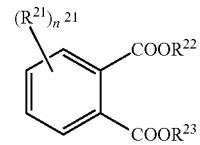

(1B)

In General Formula (1B), $R^{21}$ represents a non-aromatic substituent. The non-aromatic substituent represented by $R^{21}$ has the same meaning as the non-aromatic substituent represented by $R^{11}$ in General Formula (1A), and a suitable aspect thereof is also the same.

$n^{21}$ represents an integer of 0 to 4. $n^{21}$ preferably represents an integer of 0 to 2.

In a case where $n^{21}$ represents an integer of 2 or more, a plurality of $R^{21}$'s may be the same or different from each other.

$R^{22}$ and $R^{23}$ each independently represent a monovalent aliphatic hydrocarbon group. Examples of the monovalent aliphatic hydrocarbon group represented by $R^{22}$ and $R^{23}$ include the same group as the monovalent aliphatic hydrocarbon group represented by $R^{11}$.

Specific examples of the compound represented by General Formula (1B) include dimethyl phthalate, diethyl phthalate, dibutyl phthalate, dihexyl phthalate, and dicyclohexyl phthalate.

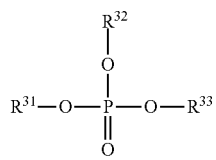
(1C)

In General Formula (1C), $R^{31}$ to $R^{33}$ each independently represent an alkyl group which may have a substituent or an aryl group which may have a substituent. However, at least one of $R^{31}$ to $R^{33}$ represents an aryl group which may have a substituent.

The above-described alkyl group represented by $R^{31}$ to $R^{33}$ may be linear, branched, or cyclic. In addition, the number of carbon atoms in the alkyl group is, for example, 1 to 20, preferably 1 to 10, more preferably 1 to 8, and still more preferably 1 to 6.

As the aryl group represented by $R^{31}$ to $R^{33}$, an aryl group having 6 to 20 carbon atoms is preferable, a phenyl group or a naphthyl group is more preferable, and a phenyl group is still more preferable.

The alkyl group and aryl group represented by $R^{31}$ to $R^{33}$ may have a non-aromatic substituent. Examples of the substituent include the same as the non-aromatic substituent represented by $R^{11}$ in General Formula (1A), and a suitable aspect thereof is also the same.

Specific examples of the compound represented by General Formula (1D) include triphenyl phosphate (TPP), tricresyl phosphate (TCP), trixylenyl phosphate (TXP), cresyl diphenyl phosphate (CDP), 2-ethylhexyldiphenyl phosphate (EHDP), t-butylphenyl diphenyl phosphate (t-BDP), bis-(t-butylphenyl)phenyl phosphate (BBDP), tris-(t-butylphenyl) phosphate (TBDP), isopropylphenyl diphenyl phosphate (IPP), bis-(isopropylphenyl)diphenyl phosphate (BIPP), and tris-(isopropylphenyl) phosphate (TIPP).

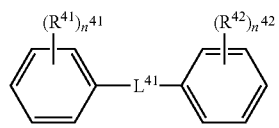
(1D)

In General Formula (1D), $L^{41}$ represents a single bond or a divalent aliphatic hydrocarbon group.

The divalent aliphatic hydrocarbon group represented by $L^{41}$ may be a divalent saturated aliphatic hydrocarbon group or a divalent unsaturated aliphatic hydrocarbon group. In addition, it may be linear, branched, or cyclic.

The number of carbon atoms in the above-described divalent aliphatic hydrocarbon group is not particularly limited, but is 1 to 20, preferably 1 to 15, more preferably 1 to 10, still more preferably 1 to 6, particularly preferably 1 to 4, and most preferably 1 or 2.

Examples of the above-described divalent aliphatic hydrocarbon group include an alkylene group, an alkenylene group, and an alkynylene group, and an alkylene group is preferable. In addition, the above-described divalent aliphatic hydrocarbon group may be substituted with a divalent group represented by $>C=CH_2$ at a carbon atom.

$R^{41}$ and $R^{42}$ each independently represent a non-aromatic substituent including no heteroatom.

The non-aromatic substituent including no heteroatom, represented by $R^{41}$ and $R^{42}$, is not particularly limited, but a monovalent aliphatic hydrocarbon group is preferable.

The monovalent aliphatic hydrocarbon group represented by $R^{41}$ and $R^{42}$ may be a monovalent saturated aliphatic hydrocarbon group or a monovalent unsaturated aliphatic hydrocarbon group. In addition, it may be linear, branched, or cyclic.

The number of carbon atoms in the above-described monovalent aliphatic hydrocarbon group is not particularly limited, but is, for example, 1 to 20. As an example of a suitable aspect of the number of carbon atoms in the above-described monovalent aliphatic hydrocarbon group, 1 to 15 is preferable, 1 to 10 is more preferable, 1 to 6 is still more preferable, 1 to 4 is particularly preferable, and 1 to 3 is most preferable.

Examples of the above-described monovalent aliphatic hydrocarbon group include an alkyl group, an alkenyl group, and an alkynyl group, and an alkyl group is preferable.

$n^{41}$ and $n^{42}$ each independently represent an integer of 0 to 5. $n^{41}$ and $n^{42}$ preferably represent an integer of 0 to 2. Among these, it is preferable that any one of $n^{41}$ or $n^{42}$ represents 1 or 2, and the other represents 0 or 1.

In a case where $n^{41}$ and $n^{42}$ represent an integer of 2 or more, a plurality of $R^{41}$'s and a plurality of $R^{42}$'s may be the same or different from each other.

Specific examples of the compound represented by General Formula (1D) include phenylxylylethane, isopropylbiphenyl (for example, 4-isopropylbiphenyl), diisopropylbiphenyl (for example, 4,4'-isopropylbiphenyl), α-methylstyrene dimer, 1,2-dimethyl-4-(1-phenylethyl)benzene, 1,3-dimethyl-4-(1-phenylethyl)benzene, 1,4-dimethyl-2-(1-phenylethyl)benzene, and 1-(ethylphenyl)-1-phenylethane.

(1E)

In General Formula (1E), $L^{51}$ represents a single bond.

$R^{51}$ represents a non-aromatic substituent including no heteroatom. The non-aromatic substituent including no heteroatom, represented by $R^{51}$, has the same meaning as the non-aromatic substituent including no heteroatom, represented by $R^{41}$ in General Formula (1D), and a suitable aspect thereof is also the same.

$n^{51}$ represents an integer of 0 to 5. $n^{51}$ preferably represents an integer of 0 to 2.

In a case where $n^{51}$ represents an integer of 2 or more, a plurality of $R^{51}$'s may be the same or different from each other.

$R^{52}$ represents a monovalent aliphatic hydrocarbon group. Examples of the monovalent aliphatic hydrocarbon group represented by $R^{52}$ include the same group as the monovalent aliphatic hydrocarbon group represented by $R^{12}$ in General Formula (1A) described above. The number of carbon atoms in the monovalent aliphatic hydrocarbon group represented by $R^{52}$ is preferably 5 to 20. In addition, the monovalent aliphatic hydrocarbon group represented by $R^{52}$ is preferably linear or branched.

Examples of the compound represented by General Formula (1E) include linear or branched alkylbenzenes having 5 to 20 carbon atoms.

A molecular weight of the aromatic solvent is not particularly limited, and is usually 100 or more. Among these, 150 or more is preferable. An upper limit thereof is not particularly limited, but is preferably 1000 or less, more preferably 600 or less, and still more preferably 500 or less.

The aromatic solvent preferably includes one or more aromatic solvents having a boiling point of 100° C. or higher. From the viewpoint that the effects of the present invention are more excellent, it is more preferable that all aromatic solvents contained in the specific microcapsule have a boiling point of 100° C. or higher. In a case where the boiling point is 100° C. or higher, the aromatic solvent tends to remain without being removed from the capsule in a case where the microcapsule is subjected to a heating process such as a reaction.

From the viewpoint that the effects of the present invention are more excellent, the boiling point of the aromatic solvent is more preferably 120° C. or higher, still more preferably 150° C. or higher, and particularly preferably 200° C. or higher. The upper limit value of the boiling point is not particularly limited, but is, for example, 400° C. or lower.

(Other Components)

The specific microcapsule may contain, as necessary, one or more additives such as a solvent other than the aromatic solvent, a reducing agent, a light stabilizer, a wax, an ultraviolet absorber, and an odor suppressant, in addition to the above-described components. Among these, it is preferable to contain a solvent other than the aromatic solvent or a light stabilizer.

Solvent Other than Aromatic Solvent

The specific microcapsule may contain a solvent other than the aromatic solvent.

A content of the aromatic solvent in the specific microcapsule is preferably 50% to 100% by mass, more preferably 75% to 100% by mass, still more preferably 85% to 100% by mass, and particularly preferably 90% to 100% by mass with respect to the total mass of the solvent.

Light Stabilizer

The light stabilizer is not particularly limited as long as it is a material which stabilizes with light, but it is preferably a light stabilizer which acts as a so-called free-radical scavenger, trapping free radicals of the activated photoactivator.

The light stabilizer may be used alone or in combination of two or more kinds thereof.

Examples of the light stabilizer include polyhydric phenols such as 2,5-bis(1,1,3,3-tetramethylbutyl)hydroquinone, hydroquinone, catechol, resorcinol, and hydroxyhydroquinone; aminophenols such as o-aminophenol and p-aminephenol.

A content ratio of the light stabilizer to the photoactivator (light stabilizer/photoactivator (molar ratio)) is preferably 0.0001 to 100 and more preferably 0.0005 to 10.

Reducing Agent

The reducing agent has a function of inactivating the photooxidant.

In a case where the specific microcapsule contains a reducing agent, a rapid change in color optical density of the ultraviolet-sensing layer due to ultraviolet irradiation can be suppressed, and the color optical density can be easily changed according to the amount of ultraviolet irradiation. The reducing agent may also function as an antioxidant.

The reducing agent may be used alone or in combination of two or more kinds thereof.

Examples of the reducing agent include a cyclic phenylhydrazide compound. Specific examples thereof include 1-phenylpyrazolidin-3-one, 1-phenyl-4-methylpyrazolidin-3-one, 1-phenyl-4,4-dimethylpyrazolidin-3-one, 3-methyl-1-p-sulfophenyl-2-pyrazolin-5-one, 3-methyl-1-phenyl-2-pyrazolin-5-one, and 4-hydroxymethyl-4-methyl-1-phenyl-3-pyrazolidinone (Dimezone S, manufactured by Daito Chemical Co., Ltd.).

As the reducing agent, reducing agents described in paragraphs 0072 to 0075 of WO2016/017701A can be referred to. The contents thereof are incorporated in the present specification.

(Production Method of Specific Microcapsule)

A production method of the specific microcapsule is not particularly limited, and examples thereof include known methods such as an interfacial polymerization method, an internal polymerization method, a phase separation method, an external polymerization method, and a coacervation method.

As an example of the production method of the specific microcapsule, a method including the following emulsification step and encapsulation step can be mentioned. In the encapsulation step, it is preferable to form a resin wall (capsule wall) by an interfacial polymerization method.

Emulsification step: a step of mixing the color-forming agent, the photoactivator, the aromatic solvent, and an emulsifier in water to prepare an emulsified liquid Encapsulation step: a step of forming a resin wall (capsule wall) around an oil droplet including the color-forming agent, the photoactivator, and the aromatic solvent in the emulsified liquid obtained in the step to encapsulate the oil droplet Hereinafter, the interfacial polymerization method as the example of the production method of the specific microcapsule, in which the capsule wall is polyurea or polyurethane urea, will be described.

The interfacial polymerization method is preferably an interfacial polymerization method including a step (emulsification step) of dispersing an oil phase, which contains a photoactivator selected from a photooxidant and a photoacid generator, an aromatic solvent, a solvent including an aliphatic structure with a boiling point of lower than 100° C., a color-forming agent, and a capsule wall material (for example, polyisocyanate), in a water phase which contains an emulsifier to prepare an emulsified liquid; and a step (encapsulation step) of forming a capsule wall by polymerizing the capsule wall material at an interface between the oil phase and the water phase, and forming a microcapsule containing the photoactivator selected from the photooxidant and the photoacid generator, the aromatic solvent, and the color-forming agent.

In the above-described emulsification step, the solvent including an aliphatic structure with a boiling point of lower than 100° C. is usually a component which can be added for the purpose of improving solubility of the core material in the solvent. The solvent including an aliphatic structure does not include an aromatic ring in the molecule.

The solvent including an aliphatic structure is not particularly limited, and examples thereof include ethyl acetate, isopropyl acetate, methyl ethyl ketone, and methylene chloride.

The solvent including an aliphatic structure may be used alone or in combination of two or more kinds thereof.

In addition, the type of the emulsifier used in the above-described emulsification step is not particularly limited, and examples thereof include a dispersant and a surfactant.

Examples of the dispersant include colloids which protect water-soluble polymers selected from known anionic polymers, non-ionic polymers, and amphoteric polymer, and specific examples thereof include polyvinyl alcohol, gelatin, and cellulose derivative. Among these, polyvinyl alcohol is preferably used.

The surfactant is preferably an anionic or non-ionic surfactant, and examples thereof include alkylbenzenesulfonates (such as sodium dodecylbenzenesulfonate and ammonium dodecylbenzenesulfonate), alkylsulfonates (such as sodium lauryl sulfate and sodium dodecylbenzenesulfonate), dioctyl sulfosuccinate sodium salts, and polyalkylene glycols (such as polyoxyethylene nonylphenyl ether).

In addition, as another production method of the specific microcapsule, methods described in U.S. Pat. Nos. 3,726,804A and 3,796,696A can also be referred to. The contents thereof are incorporated in the present specification.

A content of the specific microcapsule in the ultraviolet-sensing layer is not particularly limited, but is preferably 50% to 99% by mass and more preferably 70% to 90% by mass with respect to the total mass of the ultraviolet-sensing layer.

The ultraviolet-sensing layer may contain a component other than the above-described specific microcapsule.

Examples of other components include a polymer binder, a reducing agent, a crosslinking agent, a sensitizer, an ultraviolet absorber, and a surfactant.

Examples of the polymer binder include various emulsions such as polyvinyl alcohol, methylcellulose, carboxymethylcellulose, hydroxypropylcellulose, gum arabic, gelatin, polyvinylpyrrolidone, casein, styrene-butadiene latex, acrylonitrile-butadiene latex, polyvinyl acetate, polyacrylic acid ester, and ethicine-vinyl acetate copolymer.

In addition, as the polymer binder, a polymer binder described in paragraph 0078 of JP2017-167155A can be referred to. The contents thereof are incorporated in the present specification.

The polymer binder may be crosslinked. In other words, the polymer binder may be a crosslinked binder.

The crosslinking agent is not particularly limited, and for example, glyoxazole can be used. In addition, a crosslinking agent described in paragraph 0079 of JP2017-167155A can also be referred to. The contents thereof are incorporated in the present specification.

As the reducing agent, the sensitizer, and the surfactant, description in lower left column of page 9 to upper left column of page 10 in JP1989-207741A (JP-H1-207741A) and in paragraphs 0038, 0039, and 0048 to 0059 of JP2004-233614A can be referred to, the contents of which are incorporated in the present specification.

In addition, as the reducing agent, the light stabilizer, the ultraviolet absorber, and the surfactant, the reducing agent, the light stabilizer, the ultraviolet absorber, and the surfactant, which can be contained in the specific microcapsule, can also be used.

A mass (coating amount of solid content) per unit area of the ultraviolet-sensing layer is not particularly limited, but for example, is preferably 3 to 30 $g/m^2$, more preferably 5 to 25 $g/m^2$, and still more preferably 5 to 20 $g/m^2$.

A thickness of the ultraviolet-sensing layer is preferably 0.1 to 30 μm and more preferably 1 to 25 μm.

<Method for Forming Ultraviolet-Sensing Layer>

A method for forming the above-described ultraviolet-sensing layer is not particularly limited, and examples thereof include known methods.

Examples thereof include a method of applying a dispersion liquid for forming an ultraviolet-sensing layer, which contains the specific microcapsule, onto a support, and as necessary, drying the coating film.

It is preferable that the dispersion liquid for forming an ultraviolet-sensing layer contains at least the specific microcapsule. The microcapsule dispersion liquid obtained by the above-described interfacial polymerization method may be used as the dispersion liquid for forming an ultraviolet-sensing layer.

The dispersion liquid for forming an ultraviolet-sensing layer may contain other components which may be contained in the above-described ultraviolet-sensing layer.

The method of applying the dispersion liquid for forming an ultraviolet-sensing layer is not particularly limited, examples of a coating machine used for the applying include an air knife coater, a rod coater, a bar coater, a curtain coater, a gravure coater, an extrusion coater, a die coater, a slide bead coater, and a blade coater.

After the dispersion liquid for forming an ultraviolet-sensing layer is applied onto the support, the coating film may be subjected to a drying treatment, as necessary. Examples of the drying treatment include a heating treatment.

Although the method for forming the ultraviolet-sensing layer on the support has been described, the present invention is not limited to the above-described aspect. For example, after forming the ultraviolet-sensing layer on a temporary support, the temporary support may be peeled off to form the ultraviolet-sensing member including the ultraviolet-sensing layer.

The temporary support is not particularly limited as long as it is a peelable support.

<<Other Layers>>

The ultraviolet-sensing member may include a layer other than the support and the ultraviolet-sensing layer described above. Examples of other layers include a reflective layer, a glossy layer, a sensitivity-adjusting layer, and a filter layer.

<Reflective Layer>

The ultraviolet-sensing member may further include a reflective layer.

In a case where the ultraviolet-sensing member includes a reflective layer, since ultraviolet rays irradiated to the ultraviolet-sensing member can be reflected by the layer having ultraviolet reflectivity, scattering of the ultraviolet rays inside the ultraviolet-sensing member can be suppressed, and detection accuracy of the amount of ultraviolet rays can be further improved.

A reflectivity of the reflective layer with respect to light having a wavelength of 300 to 380 nm is preferably 10% or more, and more preferably 50% or more. The reflectivity can be measured, for example, by diffusion reflection measurement using an ultraviolet-visible spectrophotometer (UV-2700, Shimadzu Corporation).

In a case where the support is disposed adjacent to the reflective layer, an adhesive layer may be provided between the support and the reflective layer.

As the reflective layer, the adhesive layer, and manufacturing methods thereof, the reflective layer, the adhesive layer, and manufacturing methods thereof, which are described in paragraphs 0082 to 0091 of WO2016/017701A, can be referred to. The contents thereof are incorporated in the present specification.

<Glossy Layer>

The ultraviolet-sensing member may further include a glossy layer.

In a case where the ultraviolet-sensing member includes a glossy layer, visibility of front and back surfaces can be improved.

As the glossy layer and a manufacturing method thereof, the glossy layer and a manufacturing method thereof, which are described in paragraphs 0092 to 0094 of WO2016/017701A, can be referred to. The contents thereof are incorporated in the present specification.

<Filter Layer>

The ultraviolet-sensing member may further include a filter layer.

The filter layer is a layer which selectively transmits light having a specific wavelength. Here, the "selectively transmits light having a specific wavelength" means transmitting the light having a specific wavelength and shielding other lights. For example, a transmittance of light having a wavelength to be transmitted is preferably 70% or more, more preferably 80% or more, and still more preferably 90% or more. A transmittance of light having a wavelength to be shielded is preferably 30% or less, more preferably 20% or less, and still more preferably 10% or less.

As the filter layer and a manufacturing method thereof, the filter layer and a manufacturing method thereof, which are described in paragraphs 0016 to 0026 of WO2016/017701A, can be referred to. The contents thereof are incorporated in the present specification.

<Sensitivity-Adjusting Layer>

In a case where the ultraviolet-sensing member includes the filter layer, a sensitivity-adjusting layer may be further provided on a surface of the filter layer. In a case where the ultraviolet-sensing member includes a sensitivity-adjusting layer, the amount of ultraviolet irradiation, contributing to color formment, is adjusted, and color can be formed according to the amount of ultraviolet rays.

The sensitivity-adjusting layer may be a layer which affects the amount of ultraviolet irradiation, contributing to color formment, and examples thereof include a layer containing a resin and pigment fine particles and a film used for a surface protective film, a laminate film, or the like.

As the sensitivity-adjusting layer and a manufacturing method thereof, the sensitivity-adjusting layer and a manufacturing method thereof, which are described in paragraphs 0095 to 0109 of WO2016/017701A, can be referred to. The contents thereof are incorporated in the present specification.

Other Embodiments

Hereinafter, examples of other embodiments of the ultraviolet-sensing member will be described. It should be noted that the reflective layers described in the first embodiment can be adopted to the support, the ultraviolet-sensing layer, the reflective layer, the adhesive layer, the sensitivity-adjusting layer, and the filter layer constituting the other embodiments described below.

Second Embodiment

Figure 2:
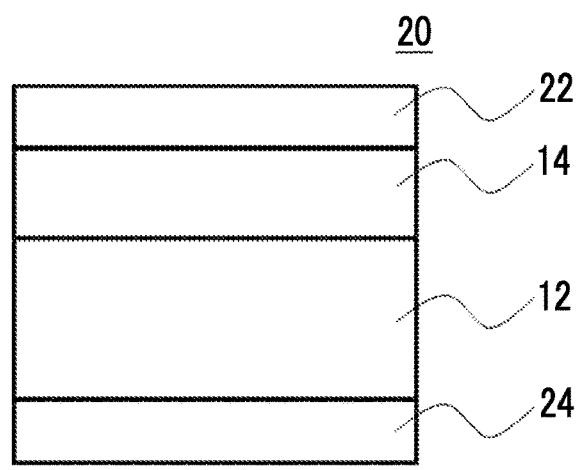
FIG. 2 is a schematic cross-sectional view showing another example of the embodiment of the ultraviolet-sensing member according to the present invention.

FIG. 2 is a schematic cross-sectional view showing another embodiment of the ultraviolet-sensing member.

An ultraviolet-sensing member 20 includes a support 12, an ultraviolet-sensing layer 14 which is disposed on one surface of the support 12 and contains a microcapsule containing a photoactivator, a color-forming agent, and an aromatic solvent, and a filter layer 22 which is disposed on a surface of the ultraviolet-sensing layer 14. In addition, the ultraviolet-sensing member 20 includes a reflective layer 24 on a surface of the support 12 opposite to the ultraviolet-sensing layer 14. The reflective layer 24 may be formed directly on the surface of the support 12, or may be disposed through an adhesion layer (not shown) or the like.

Third Embodiment

Figure 3:
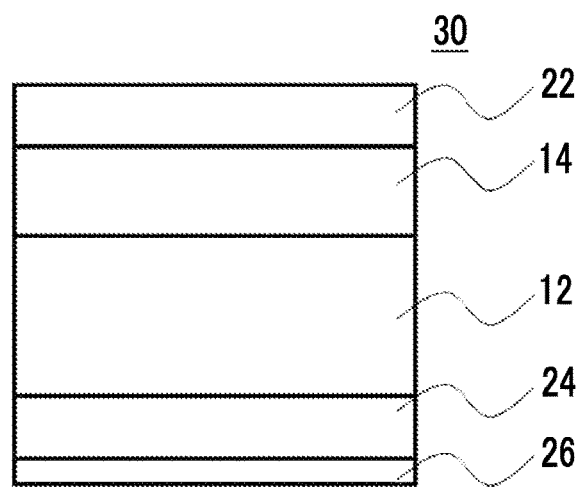
FIG. 3 is a schematic cross-sectional view showing another example of the embodiment of the ultraviolet-sensing member according to the present invention.

FIG. 3 is a schematic cross-sectional view showing another embodiment of the ultraviolet-sensing member.

An ultraviolet-sensing member 30 includes a support 12, an ultraviolet-sensing layer 14 which is disposed on one surface of the support 12 and contains a microcapsule containing a photoactivator, a color-forming agent, and an aromatic solvent, and a filter layer 22 which is disposed on a surface of the ultraviolet-sensing layer 14. In addition, the ultraviolet-sensing member 30 includes a reflective layer 24 on a surface of the support 12 opposite to the ultraviolet-sensing layer 14, and includes a glossy layer 26 on a surface of the reflective layer 24. The reflective layer 24 may be formed directly on the surface of the support 12, or may be disposed through an adhesion layer (not shown) or the like.

Fourth Embodiment

Figure 4:
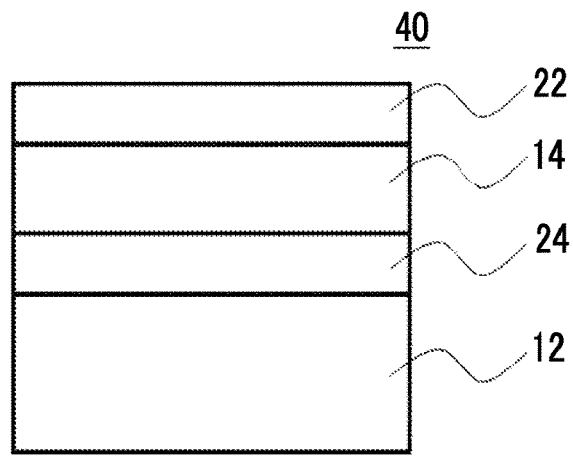
FIG. 4 is a schematic cross-sectional view showing another example of the embodiment of the ultraviolet-sensing member according to the present invention.

FIG. 4 is a schematic cross-sectional view showing another embodiment of the ultraviolet-sensing member.

An ultraviolet-sensing member 40 includes a support 12, a reflective layer 24 which is disposed on one surface of the support 12, an ultraviolet-sensing layer 14 which is disposed on a surface of the reflective layer 24 and contains a microcapsule containing a photoactivator, a color-forming agent, and an aromatic solvent, and a filter layer 22 which is disposed on a surface of the ultraviolet-sensing layer 14. The reflective layer 24 may be formed directly on the surface of the support 12, or may be disposed through an adhesion layer (not shown) or the like.

Fifth Embodiment

Figure 5:
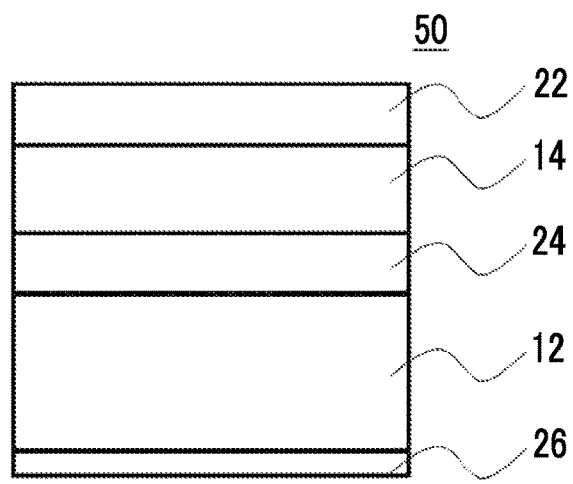
FIG. 5 is a schematic cross-sectional view showing another example of the embodiment of the ultraviolet-sensing member according to the present invention.

FIG. 5 is a schematic cross-sectional view showing another embodiment of the ultraviolet-sensing member.

An ultraviolet-sensing member 50 includes a support 12, a reflective layer 24 which is disposed on one surface of the support 12, an ultraviolet-sensing layer 14 which is disposed on a surface of the reflective layer 24 and contains a microcapsule containing a photoactivator, a color-forming agent, and an aromatic solvent, and a filter layer 22 which is disposed on a surface of the ultraviolet-sensing layer 14. In addition, the ultraviolet-sensing member 50 includes a glossy layer 26 on a surface of the support 12 opposite to the reflective layer 24. The reflective layer 24 may be formed directly on the surface of the support 12, or may be disposed through an adhesion layer (not shown) or the like.

Sixth Embodiment

Figure 6:
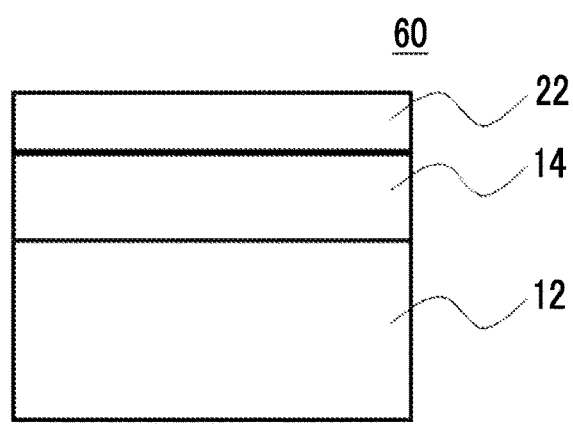
FIG. 6 is a schematic cross-sectional view showing another example of the embodiment of the ultraviolet-sensing member according to the present invention.

FIG. 6 is a schematic cross-sectional view showing another embodiment of the ultraviolet-sensing member.

An ultraviolet-sensing member 60 includes a support 12, an ultraviolet-sensing layer 14 which is disposed on one surface of the support 12 and contains a microcapsule containing a photoactivator, a color-forming agent, and an aromatic solvent, and a filter layer 22 which is disposed on a surface of the ultraviolet-sensing layer 14.

Other Embodiments

In the second to sixth embodiments, an aspect of the ultraviolet-sensing member provided with the filter layer 22 has been shown, but the filter layer 22 may not be disposed.

In the second to sixth embodiments, the sensitivity-adjusting layer (not shown) may be disposed adjacent to the filter layer 22.

[Characteristics and Applications of Ultraviolet-Sensing Member]

The ultraviolet-sensing member according to the embodiment of the present invention can form color according to the amount of ultraviolet rays, and a difference in color density of the colored part can be visually confirmed. In addition, in a case of a sheet-like ultraviolet-sensing member, it is possible to measure the amount of ultraviolet rays in a wide area.

In the ultraviolet-sensing member, an inclination of a straight line obtained by plotting a graph on which a logarithmic value of an integrated illuminance of light having a wavelength of 365 nm, which is irradiated to the ultraviolet-sensing member, is plotted on the horizontal axis and a color optical density of the ultraviolet-sensing layer is plotted on the vertical axis can be used for desired applications. For example, in a case where the inclination is gentle (in other words, gradation is gentle), the ultraviolet-sensing member can be applied to a wide energy range, and in a case where the inclination is steep (in other words, gradation is steep), fine energy difference can be read.

In the present specification, the "integrated illuminance" is an integrated illuminance measured at a wavelength of 365 nm, and examples thereof include a value measured by a 365 nm UV luminometer.

In addition, the "color optical density" is a numerical value defined by a reflection density $D = -\log_{10} \rho$ ($\rho$ is a reflectivity), and can be measured using a reflection densitometer (X-Rite 310, manufactured by X-Rite Inc.).

In addition, the following method may be used as the method for measuring the difference in color density of the colored part.

After a predetermined ultraviolet ray is irradiated to the ultraviolet-sensing member to form color, an image of the obtained member is read using a reader such as a scanner (for example, GT-F740/GT-X830, manufactured by Seiko Epson Corp.) or a smartphone, and the obtained image is analyzed for the density of the colored part using an UV light intensity distribution analysis system (FUD-7010J, manufactured by FUJIFILM Corporation). Correction process and calibration process may be performed as necessary.

The ultraviolet-sensing member can be used, for example, for measuring the amount of ultraviolet rays emitted from an ultraviolet irradiation device in a case of manufacturing a member while a ultraviolet curing resin is ultraviolet-cured by roll-to-roll. In addition, for example, in order to grasp the degree of sunburn caused by ultraviolet rays of a person or an object, it is also possible to measure the amount of ultraviolet rays in the daytime on a daily basis.

[Dispersion Liquid for Forming Ultraviolet-Sensing Layer and Production Method Thereof]

In addition, the present invention also relates to a dispersion liquid for forming an ultraviolet-sensing layer and a production method thereof, which can form the ultraviolet-sensing layer of the ultraviolet-sensing member described above.

The dispersion liquid for forming an ultraviolet-sensing layer according to the embodiment of the present invention is a dispersion liquid for forming an ultraviolet-sensing layer, containing a microcapsule containing a photoactivator, a color-forming agent, and an aromatic solvent, in which the aromatic solvent includes an aromatic solvent including a heteroatom and an aromatic solvent including no heteroatom. That is, the dispersion liquid for forming an ultraviolet-sensing layer according to the embodiment of the present invention corresponds to a dispersion liquid containing the specific microcapsule described above.

Hereinafter, composition of the dispersion liquid for forming an ultraviolet-sensing layer according to the embodiment of the present invention will be described in detail.

The dispersion liquid for forming an ultraviolet-sensing layer according to the embodiment of the present invention contains the specific microcapsule. The specific microcapsule is the same as the specific microcapsule contained in the ultraviolet-sensing member, and a suitable aspect thereof is also the same.

A content of the specific microcapsule in the dispersion liquid for forming an ultraviolet-sensing layer is preferably 50% to 99% by mass and more preferably 70% to 90% by mass with respect to the total solid content in the composition.

The dispersion liquid for forming an ultraviolet-sensing layer according to the embodiment of the present invention may also contain a component other than the specific microcapsule which can be contained in the ultraviolet-sensing layer. Examples of other components include a polymer binder, a crosslinking agent (a crosslinking agent for forming a crosslinked polymer binder (for example, glyoxazole and the like)), a reducing agent, a sensitizer, and a surfactant. Specific examples of the other components are as described above.

In a case where the dispersion liquid for forming an ultraviolet-sensing layer contains a polymer binder, a content of the polymer binder is preferably 1% to 50% by mass, more preferably 5% to 40% by mass, and still more preferably 10% to 30% by mass with respect to the total solid content in the composition.

In a case where the dispersion liquid for forming an ultraviolet-sensing layer contains a surfactant, a content of the surfactant is preferably 0.01% to 10% by mass, more preferably 0.1% to 5% by mass, and still more preferably 0.2% to 1% by mass with respect to the total solid content in the composition.

The production method of the dispersion liquid for forming an ultraviolet-sensing layer is not particularly limited, and examples thereof include a method including the above-described production method of the specific microcapsule. That is, examples thereof include a production method including the emulsification step and encapsulation step described above. It is preferable that the dispersion liquid for forming an ultraviolet-sensing layer is a composition which is obtained by adding optional components for forming the ultraviolet-sensing layer to the microcapsule dispersion liquid obtained by the production method including the emulsification step and encapsulation step described above.

[Ultraviolet-Sensing Kit]

In addition, the present invention also relates to an ultraviolet-sensing kit including the above-described ultraviolet-sensing member.

The ultraviolet-sensing kit includes at least the above-described ultraviolet-sensing member.

A specific configuration of the ultraviolet-sensing kit is not particularly limited, and examples thereof include an aspect of including the ultraviolet-sensing member and other elements selected from the group consisting of a member having a filter layer which selectively transmits light having a specific wavelength (preferably a filter sheet which shields light having a wavelength of 300 nm or more, and more preferably a filter sheet which shields light having a wavelength of more than 230 nm), a light shielding bag (ultraviolet cut bag), a sample judgment, a limit sample (calibration sheet), a condensing jig such as a lens and a concave mirror, and a holding member which holds the ultraviolet-sensing member.

The above-described holding member may have an opening portion for irradiating the held ultraviolet-sensing member with ultraviolet rays, or the holding member and a determination sample may be integrated.

In addition, the specific microcapsule may be kneaded into a resin to form a molded body. Examples of the resin include resins exemplified as a material of the resin sheet as the support.

EXAMPLES

Hereinbelow, the present invention will be described in more detail with reference to Examples. The materials, the amounts of materials used, the proportions, the treatment details, and the treatment procedure in Examples below may be appropriately modified as long as the modifications do not depart from the spirit of the present invention. Therefore, the scope of the present invention should not be construed as being limited by the following examples. In the following, "parts" and "%" are based on mass unless otherwise specified.

[Production of Ultraviolet-Sensing Member]

Example 1

A mixed solution 1 having the following composition was added to 202 parts of a 5% by mass aqueous solution of polyvinyl alcohol, and then emulsified and dispersed at 20° C. to obtain an emulsified liquid having a volume average particle diameter of 1 μm. Further, the obtained emulsified liquid was continuously stirred at 50° C. for 8 hours. Thereafter, the emulsified liquid was returned to room temperature, and filtered to obtain an aqueous capsule dispersion liquid.

<Composition of Mixed Solution 1>

| | |
|---|---|
| Color-forming agent: LEUCO CRYSTAL VIOLET (product name "LCV", manufactured by Yamada Chemical Co., Ltd.) | 2.5 parts |
| Organic halogen compound: tribromomethylphenylsulfone (BMPS, manufactured by SUMITOMO SEIKA CHEMICALS CO., LTD.) | 1.25 parts |
| Aromatic solvent 1: tricresyl phosphate (manufactured by DAIHACHI CHEMICAL INDUSTRY CO., LTD.) | 23 parts |
| Aromatic solvent 2: phenylxylylethane (product name "Nisseki Hisol SAS296", manufactured by JX Nippon Oil and Energy Corp) | 7 parts |
| Non-aromatic solvent: ethyl acetate (manufactured by SHOWA DENKO K.K.) | 50 parts |
| Light stabilizer: 2,5-bis(1,1,3,3-tetramethylbutyl)hydroquinone (BTHQ, manufactured by TOKYO CHEMICAL INDUSTRY CO., LTD.) | 3 parts |
| Capsule wall material: polyisocyanate (product name "TAKENATE D-110N", manufactured by Mitsui Chemicals, Inc., adduct of xylylene-1,3-diisocyanate and trimethylolpropane, 75% by mass ethyl acetate solution) | 31 parts |

20 parts of the obtained capsule dispersion liquid, 5 parts of a 6% by mass aqueous solution of polyvinyl alcohol (product name "Denka Size EP-130", manufactured by Denka Company Limited.), 0.04 parts of glyoxal (manufactured by Daito Chemical Co., Ltd.), and 0.09 parts of a 50% by mass aqueous solution of sodium dodecylbenzenesulfonate (manufactured by DKS Co. Ltd.) were mixed with each other to produce a dispersion liquid for forming an ultraviolet-sensing layer (coating liquid for forming an ultraviolet-sensing layer).

The obtained coating liquid for forming an ultraviolet-sensing layer was applied onto a white polyethylene terephthalate sheet (product name "CRISPER K1212", manufactured by Toyobo Co., Ltd.) having a thickness of 75 μm with a coating amount of solid content of 20 g/m², and then heated and dried at 105° for 1 minute to produce a sheet-like ultraviolet-sensing member including the support and the ultraviolet-sensing layer. The ultraviolet-sensing layer was approximately 20 μm.

Example 2

An ultraviolet-sensing member was produced by the same method as in Example 1, except that the mixed solution was changed to a mixed solution 2 having the following composition.

<Composition of Mixed Solution 2>

| | |
|---|---|
| Color-forming agent A: 3,3-bis(2-methyl-1-octyl-3-indolyl)phthalide, manufactured by BASF) | 2.5 parts |
| Organic halogen compound: tribromomethylphenylsulfone (BMPS, SUMITOMO SEIKA CHEMICALS CO., LTD.) | 1.25 parts |
| Aromatic solvent 1: tricresyl phosphate (manufactured by DAIHACHI CHEMICAL INDUSTRY CO., LTD.) | 23 parts |
| Aromatic solvent 2: phenylxylylethane (product name "Nisseki Hisol SAS296", manufactured by JX Nippon Oil and Energy Corp) | 7 parts |
| Non-aromatic solvent: ethyl acetate (manufactured by SHOWA DENKO K.K.) | 50 parts |
| Light stabilizer: 2,5-bis(1,1,3,3-tetramethylbutyl)hydroquinone (BTHQ, manufactured by TOKYO CHEMICAL INDUSTRY CO., LTD.) | 3 parts |
| Polyisocyanate: product name "TAKENATE D-110N" (manufactured by Mitsui Chemicals, Inc.) | 31 parts |

Examples 3 to 10

Ultraviolet-sensing members of Examples 3 to 10 were produced by the same method as in Example 1, except that components and formulation were changed as shown in Table 1.

Example 11

An ultraviolet-sensing member of Example 11 was produced by the same method as in Example 2, except that components and formulation were changed as shown in Table 1.

Comparative Examples 1 and 2

Ultraviolet-sensing members of Comparative Examples 1 and 2 were produced by the same method as in Example 1, except that components and formulation were changed as shown in Table 1.

Table 1 is shown below.

Each component shown in Table 1 is as follows.

Tricresyl phosphate (manufactured by DAIHACHI CHEMICAL INDUSTRY CO., LTD.)

Phenylxylylethane (product name "Nisseki Hisol SAS296", manufactured by JX Nippon Oil and Energy Corp)

Isopropylbiphenyl (manufactured by KUREHA CORPORATION)

α-Methylstyrene dimer (manufactured by Mitsui Chemicals, Inc.)

Dicyclohexyl phthalate (manufactured by OSAKA ORGANIC CHEMICAL INDUSTRY LTD.)

BMPS: tribromomethylphenylsulfone (manufactured by SUMITOMO SEIKA CHEMICALS CO., LTD.)

B-IMD: lophine dimer (2,2'-bis(2-chlorophenyl)-4,4',5,5'-tetraphenyl-1,2'-biimidazole, product name "B-IMD", manufactured by KUROGANE KASEI Co., Ltd.)

LCV: LEUCO CRYSTAL VIOLET (product name "LCV", manufactured by Yamada Chemical Co., Ltd.)

Color-forming agent A: 3,3-bis(2-methyl-1-octyl-3-indolyl)phthalide (manufactured by BASF)

BTHQ: 2,5-bis(1,1,3,3-tetramethylbutyl)hydroquinone (manufactured by TOKYO CHEMICAL INDUSTRY CO., LTD.)

In addition, in the column of "Photoactivator" in Table 1, the numerical value in parentheses described together with the component name is intended to be a blending part (part by mass).

In addition, the color-forming agents used in Examples 1 and 3 to 10, and Comparative Examples 1 and 2 correspond to a color-forming agent which forms color by oxidation. The color-forming agents used in Examples 1 and 3 to 10, and Comparative Examples 1 and 2 exhibit blue color by oxidation. On the other hand, the color-forming agents used in Examples 2 and 11 correspond to a color-forming agent which forms color by action of acid. The color-forming agents used in Examples 2 and 11 exhibit red color by action of acid.

In addition, the column of "Mass content ratio of aromatic solvent 1 to aromatic solvent 2" in Table 1 represents "aromatic solvent 1/aromatic solvent 2".

| | Microcapsule | | | | | | | Evaluation | | |
|---|---|---|---|---|---|---|---|---|---|---|
| | | | Mass content ratio of aromatic solvent 1 to aromatic solvent 2 | Photoactivator | | Color-developing agent | Light stabilizer (scavenger) | Image stability | Storage stability | Sensitivity |
| | Aromatic solvent 1 | Aromatic solvent 2 | | Organic halogen compound | Radical generator | | | | | |
| Example 1 | Tricresyl phosphate | Phenyl-xylylethane | 77/23 | BMPS (1.25) | — | LCV | BTHQ | A | A | A |
| Example 2 | Tricresyl phosphate | Phenyl-xylylethane | 77/23 | BMPS (1.25) | — | Color-developing agent A | BTHQ | B | A | A |
| Example 3 | Tricresyl phosphate | Phenyl-xylylethane | 90/10 | BMPS (1.25) | — | LCV | BTHQ | A | B | A |

-continued

| | | Microcapsule | | | | | Evaluation | | |
|---|---|---|---|---|---|---|---|---|---|
| | | Mass content ratio of aromatic solvent 1 to aromatic solvent 2 | Photoactivator | | Color-developing agent | Light stabilizer (scavenger) | Image stability | Storage stability | Sensitivity |
| | Aromatic solvent 1 | Aromatic solvent 2 | | Organic halogen compound | Radical generator | | | | | |
| Example 4 | Tricresyl phosphate | Phenyl-xylylethane | 85/15 | BMPS (1.25) | — | LCV | BTHQ | A | A | A |
| Example 5 | Tricresyl phosphate | Phenyl-xylylethane | 50/50 | BMPS (1.25) | — | LCV | BTHQ | A | A | A |
| Example 6 | Tricresyl phosphate | Phenyl-xylylethane | 35/65 | BMPS (1.25) | — | LCV | BTHQ | A | A | A |
| Example 7 | Tricresyl phosphate | Phenyl-xylylethane | 25/75 | BMPS (1.25) | — | LCV | BTHQ | B | A | B |
| Example 8 | Tricresyl phosphate | Isopropyl-biphenyl | 77/23 | BMPS (1.25) | — | LCV | BTHQ | A | A | A |
| Example 9 | Tricresyl phosphate | α-Methyl-styrene dimer | 77/23 | BMPS (1.25) | — | LCV | BTHQ | A | A | A |
| Example 10 | Tricresyl phosphate | Phenyl-xylylethane | 77/23 | BMPS (1.25) | B-IMD (2.5) | LCV | BTHQ | A | A | A |
| Example 11 | Dicyclohexyl phthalate | Phenyl-xylylethane | 77/23 | BMPS (1.25) | — | Color-developing agent A | BTHQ | B | A | A |
| Comparative Example 1 | Tricresyl phosphate | — | — | BMPS (1.25) | — | LCV | BTHQ | A | C | A |
| Comparative Example 2 | — | Phenyl-xylylethane | — | BMPS (1.25) | — | LCV | BTHQ | C | A | B |

[Measurement and Evaluation]

Image stability, storage stability, and sensitivity of the ultraviolet-sensing members produced in each Examples and Comparative Examples were measured and evaluated by the following methods.

A color optical density of the ultraviolet-sensing member was measured with a reflection densitometer (X-Rite 310, manufactured by X-Rite Inc.). As described above, the color-forming agents used in Examples 1 and 3 to 10, and Comparative Examples 1 and 2 exhibited blue color by oxidation, while the color-forming agents used in Examples 2 and 11 exhibited red color by action of acid. In measuring the color optical density of the ultraviolet-sensing member, the numerical value of OD-M was adopted for Examples 2 and 11, and the numerical value of OD-C was adopted for Examples 1 and 3 to 10, and Comparative Examples 1 and 2.

[Image Stability]

The ultraviolet-sensing layer of the ultraviolet-sensing member produced in each Examples and Comparative Examples was irradiated with ultraviolet rays using a high-pressure mercury lamp with an integrated illuminance of 10 mJ/cm². Next, using the reflection densitometer, a density (DA1) of a colored part formed on the ultraviolet-sensing layer was measured.

Next, the above-described ultraviolet-sensing member after irradiation with ultraviolet rays was stored for 1 day in an environment of a temperature of 40° C. and a humidity of 90% RH. After the storage, using the reflection densitometer, a density (DA2) of a colored part formed on the ultraviolet-sensing layer was measured.

An evaluation was carried out according to the following evaluation standard based on a density retention rate obtained by the following expression (1). The results are shown in Table 1.

Density retention rate (%)=Density DA2/Density DA1×100    Expression (1)

(Evaluation Standard)

"A": density retention rate (%) was 95% or more.
"B": density retention rate (%) was 90% or more and less than 95%.
"C": density retention rate (%) was less than 90%.

[Storage Stability]

Using the reflection densitometer, an initial density (DA3) of the ultraviolet-sensing layer of the ultraviolet-sensing member (unused) produced in each Examples and Comparative Examples was measured.

Next, the ultraviolet-sensing member (unused) produced in each Examples and Comparative Examples was stored at a temperature of 140° C. for 600 seconds, and then a density (DA4) of the ultraviolet-sensing layer was measured using the reflection densitometer.

An evaluation was carried out according to the following evaluation standard based on a value (density change amount ΔD) obtained by subtracting the density DA3 from the density DA4. The results are shown in Table 1. As the ΔD value was smaller, the color did not form due to storage over time, and the storage stability was better.

<Evaluation Standard>

"A": ΔD was 0.2 or less.
"B": ΔD was more than 0.2 and 0.4 or less.
"C": ΔD was more than 0.4.

[Sensitivity]

The ultraviolet-sensing layer of the ultraviolet-sensing member produced in each Examples and Comparative Examples was irradiated with ultraviolet rays using a high-pressure mercury lamp with an integrated illuminance of 10 mJ/cm². Next, using the reflection densitometer, a density (DA5) of a colored part formed on the ultraviolet-sensing layer was measured, and the sensitivity was evaluated based on the following evaluation standard. As the value of the density (DA5) of the colored part is larger, the sensitivity is higher. The results are shown in Table 1.

<Evaluation Standard>

"A": 0.4 or more

"B": less than 0.4

From the results shown in Table 1, it was found that the ultraviolet-sensing member according to the embodiment of the present invention had excellent storage stability and image stability. Furthermore, it was found that the ultraviolet-sensing member according to the embodiment of the present invention also had excellent sensitivity.

In addition, from the comparison between Example 1 and Example 2, it was confirmed that, in a case where the color-forming agent was a color-forming agent which forms color by oxidation, the image stability was more excellent.

From the comparison of Examples 1 and 3 to 6, it was confirmed that, in a case where the mass content ratio of the aromatic solvent (aromatic solvent 1) including a heteroatom to the aromatic solvent (aromatic solvent 2) including no heteroatom (aromatic solvent including a heteroatom/aromatic solvent including no heteroatom) in the microcapsule was 35/65 to 85/15, the storage stability, image stability, and sensitivity were more excellent.

EXPLANATION OF REFERENCES

10, 20, 30, 40, 50, 60: ultraviolet-sensing member
12: support
14: ultraviolet-sensing layer
22: filter layer
24: reflective layer
26: glossy layer

What is claimed is:

1. An ultraviolet-sensing member comprising:
   an ultraviolet-sensing layer containing a microcapsule which contains a photoactivator, a color-forming agent, and an aromatic solvent,
   wherein the aromatic solvent includes an aromatic solvent including a heteroatom and an aromatic solvent including no heteroatom.

2. The ultraviolet-sensing member according to claim 1, wherein the photoactivator includes a compound represented by General Formula (6), $$R^3\text{-}L^1\text{-}CX^3X^4X^5 \qquad (6)$$

in the formula, $R^3$ represents an aryl group which may have a substituent or a heteroaryl group which may have a substituent, $L^1$ represents —SO— or —SO$_2$—, and $X^3$, $X^4$, and $X^5$ each independently represent a hydrogen atom or a halogen atom, where all of $X^3$, $X^4$, and $X^5$ are not hydrogen atoms at the same time.

3. The ultraviolet-sensing member according to claim 2, wherein a mass content ratio of the aromatic solvent including a heteroatom to the aromatic solvent including no heteroatom is 35/65 to 85/15.

4. The ultraviolet-sensing member according to claim 1, wherein a mass content ratio of the aromatic solvent including a heteroatom to the aromatic solvent including no heteroatom is 35/65 to 85/15.

5. The ultraviolet-sensing member according to claim 1, wherein the aromatic solvent includes one or more aromatic solvents having a boiling point of 100° C. or higher.

6. The ultraviolet-sensing member according to claim 1, wherein the aromatic solvent including a heteroatom includes aromatic phosphate.

7. The ultraviolet-sensing member according to claim 1, wherein the photoactivator is a photooxidant, and the color-forming agent is a color-forming agent which forms color by being oxidized.

8. The ultraviolet-sensing member according to claim 1, wherein the photoactivator is a photoacid generator, and the color-forming agent is a color-forming agent which forms color by action of acid.

9. The ultraviolet-sensing member according to claim 1, wherein a capsule wall of the microcapsule contains one or more resins selected from the group consisting of polyurea, polyurethane urea, and polyurethane.

10. An ultraviolet-sensing kit comprising:
    the ultraviolet-sensing member according to claim 1.

11. A microcapsule comprising:
    a photoactivator;
    a color-forming agent; and
    an aromatic solvent,
    wherein the aromatic solvent includes an aromatic solvent including a heteroatom and an aromatic solvent including no heteroatom.

12. The microcapsule according to claim 11, wherein the photoactivator includes a compound represented by General Formula (6), $$R^3\text{-}L^1\text{-}CX^3X^4X^5 \qquad (6)$$

in the formula, $R^3$ represents an aryl group which may have a substituent or a heteroaryl group which may have a substituent, $L^1$ represents —SO— or —SO$_2$—, and $X^3$, $X^4$, and $X^5$ each independently represent a hydrogen atom or a halogen atom, where all of $X^3$, $X^4$, and $X^5$ are not hydrogen atoms at the same time.

13. The microcapsule according to claim 11, wherein a mass content ratio of the aromatic solvent including a heteroatom to the aromatic solvent including no heteroatom is 35/65 to 85/15.

14. The microcapsule according to claim 11, wherein the aromatic solvent includes one or more aromatic solvents having a boiling point of 100° C. or higher.

15. The microcapsule according to claim 11, wherein the aromatic solvent including a heteroatom includes aromatic phosphate.

16. The microcapsule according to claim 11, wherein the photoactivator is a photooxidant, and the color-forming agent is a color-forming agent which forms color by being oxidized.

17. The microcapsule according to claim 11, wherein the photoactivator is a photoacid generator, and the color-forming agent is a color-forming agent which forms color by action of acid.

18. The microcapsule according to claim 11, wherein a capsule wall of the microcapsule contains one or more resins selected from the group consisting of polyurea, polyurethane urea, and polyurethane.

19. A production method of the microcapsule according to claim 11, the production method comprising:
    a step of mixing the color-forming agent, the photoactivator, the aromatic solvent, and an emulsifier in water to prepare an emulsified liquid; and
    a step of forming a resin wall around an oil droplet including the color-forming agent, the photoactivator, and the aromatic solvent in the emulsified liquid obtained in the step to encapsulate the oil droplet and form the microcapsule.

20. A dispersion liquid for forming an ultraviolet-sensing layer, comprising:
    the microcapsule according to claim 11.

* * * * *